US008483891B2

(12) United States Patent
Yakimenko et al.

(10) Patent No.: US 8,483,891 B2
(45) Date of Patent: Jul. 9, 2013

(54) AUTOMATICALLY GUIDED PARAFOIL DIRECTED TO LAND ON A MOVING TARGET

(75) Inventors: Oleg Yakimenko, Seaside, CA (US); Charles Hewgley, Pacific Grove, CA (US); Eugene Bourakov, Carmel, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 165 days.

(21) Appl. No.: 13/083,489

(22) Filed: Apr. 8, 2011

(65) Prior Publication Data

US 2013/0013135 A1    Jan. 10, 2013

Related U.S. Application Data

(60) Provisional application No. 61/324,222, filed on Apr. 14, 2010, provisional application No. 61/324,551, filed on Apr. 15, 2010, provisional application No. 61/323,792, filed on Apr. 13, 2010, provisional application No. 61/323,750, filed on Apr. 13, 2010, provisional application No. 61/323,675, filed on Apr. 13, 2010.

(51) Int. Cl.
*G06G 7/70* (2006.01)

(52) U.S. Cl.
USPC .............................................. 701/18; 701/16

(58) Field of Classification Search
USPC ....................................................... 701/18, 16
See application file for complete search history.

(56) References Cited

U.S. PATENT DOCUMENTS

| 4,124,182 | A | 11/1978 | Loeb |
| 6,338,457 | B1* | 1/2002 | Hilliard et al. ................ 244/139 |
| 6,416,019 | B1* | 7/2002 | Hilliard et al. ................ 244/139 |
| 6,758,442 | B2 | 7/2004 | Bailey |
| 6,808,144 | B1 | 10/2004 | Nicolai et al. |
| 7,210,896 | B2 | 5/2007 | Knott |
| 8,006,936 | B1 | 8/2011 | Farr, III |
| 8,131,405 | B2* | 3/2012 | Preston ............................ 701/3 |
| 2003/0025038 | A1* | 2/2003 | Nicolai et al. ................ 244/152 |
| 2007/0088466 | A1* | 4/2007 | Preston ............................ 701/3 |
| 2009/0026319 | A1 | 1/2009 | Strong |
| 2009/0278353 | A1 | 11/2009 | Da Costa Duarte Pardal et al. |
| 2010/0230546 | A1 | 9/2010 | Bevirt et al. |
| 2013/0009013 | A1 | 1/2013 | Bourakov et al. |
| 2013/0009014 | A1 | 1/2013 | Bordetsky et al. |
| 2013/0013131 | A1 | 1/2013 | Yakimenko et al. |
| 2013/0013132 | A1 | 1/2013 | Yakimenko et al. |

OTHER PUBLICATIONS

Brown et al., Parafoils for Shipboard Recovery of UAV's, 1991, American Institute of Aeronautics and Astronautics, AIAA-91-0835-CP.*

(Continued)

*Primary Examiner* — Mary Cheung
*Assistant Examiner* — Michael Berns
(74) *Attorney, Agent, or Firm* — Lisa A. Norris

(57) ABSTRACT

A method is described performing the following with a parafoil's control unit composed of electronic circuitry while the control unit is being transported with a parafoil: calculating a desired landing location for a parafoil, the desired landing location corresponding to a moving target, the calculating including using a term representative of the moving target's velocity; determining a flight path to the desired landing location; and, controlling the parafoil's flight path so as to follow the flight path.

15 Claims, 18 Drawing Sheets

OTHER PUBLICATIONS

Hewgley et al., Shipboard Landing Chalenges for Autonomous Parafoils, 2011, American Institute of Aeronautics and Astronautics, AIAA-2011-2573.*

Hewgley and Yakimenko, Precision Guided Airdrop for Vertical Replenshment of Naval Vessels, 2009, American Institute of Aeronautics and Astronautics, AIAA-2009-2995.*

Carter et al., Autonomous Large PArafoil Guidance, Navigation, and Control System Design Status, 2007, American Institute of Aeronautics and Astronautics, AIAA-2007-2514.*

Slegers, N.J., and Yakimenko, O.A. "Optimal Control for Terminal Guidance of Autonomous Parafoils." Proceedings of the 20th AIAA Aerodynamic Decelerator Systems Technology Conference, Seattle, WA, May 4-7, 2009. AIAA 2009-2958. pp. 1-21.

Yakimenko, O. A., Slegers, N.J., and Tiaden, R. "Development and Testing of the Miniature Aerial Delivery System Snowflake." Proceedings of the 20th AIAA Aerodynamic Decelerator Systems Technology Conference, Seattle, WA, May 4-7, 2009. AIAA 2009-2980. pp. 1-15.

Bourakov, E.A., Yakimenko, O.A., and Slegers, N.J. "Exploiting a GSM Network for Precise Payload Delivery." Proceedings of the 20th AIAA Aerodynamic Decelerator Systems Technology Conference, Seattle, WA, May 4-7, 2009. AIAA 2009-3004. pp. 1-14.

Yakimenko, O.A., Slegers, N.J., Bourakov, E.A., Hewgley, C.W., Bordetsky, A.B., Jensen, R.P., Robinson, A.B., Malone, J.R., and Heidt, P.E.,"Mobile System for Precise Aero Delivery with Global Reach Network Capability." ICAA 2009. IEEE International Conference on Control and Automation, 2009. Dec. 9-11, 2009. pp. 1394-1398.

Yakimenko, O.A. and Slegers, N.J. "Using Direct Methods for Terminal Guidance of Autonomous Aerial Delivery Systems." Proceedings of the European Control Conference 2009, Budapest, Hungary, Aug. 23-26, 2009. pp. 2372-2377.

Firefly brochure. [retrieved on Mar. 13, 2013]. Retrieved from the Internet: <URL:http://www.airborne-sys.com/pages/view/firefly>.

* cited by examiner

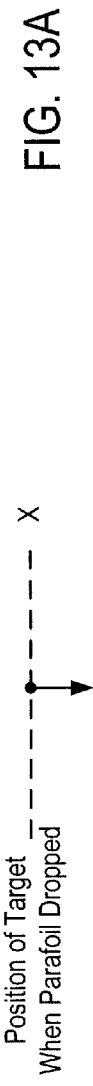
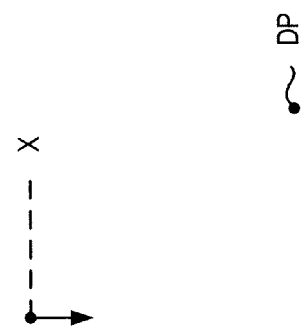
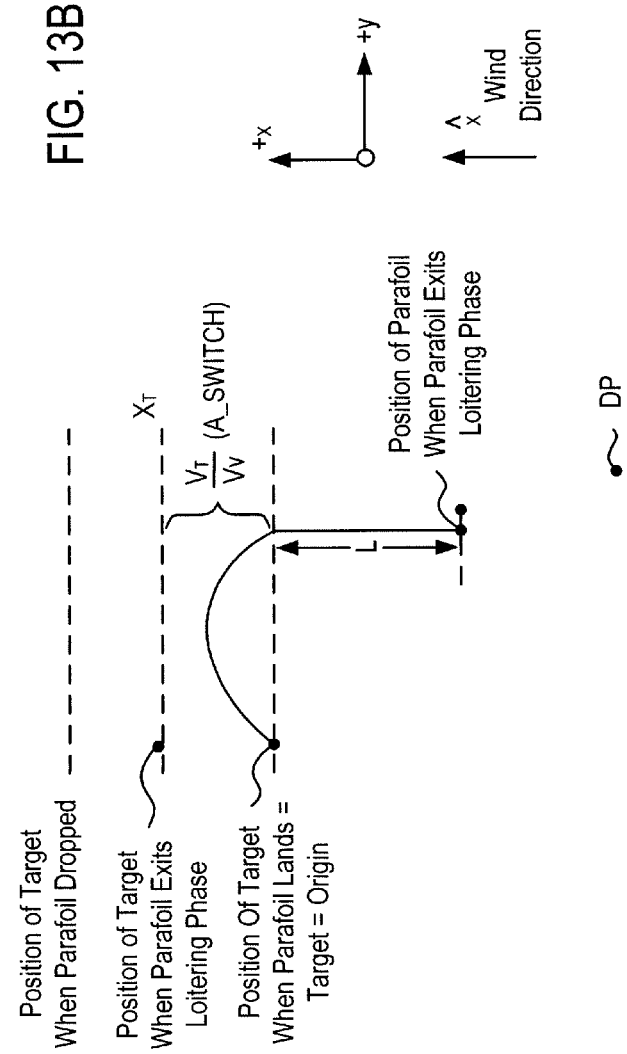
FIG. 13A
FIG. 13B

AUTOMATICALLY GUIDED PARAFOIL DIRECTED TO LAND ON A MOVING TARGET

CLAIM TO PRIORITY

The application claims the benefit of U.S. Provisional Application No. 61/324,222 entitled, "Method and System For Optimized Terminal Guidance Of Autonomous Aerial Delivery Systems", filed on Apr. 14, 2010 and U.S. Provisional Application No. 61/324,551 entitled, "Method and System for Improving Touchdown Accuracy Of Aerial Payload Delivery Using Ground Weather-Station Uplink", filed on Apr. 15, 2010, and U.S. Provisional Application No. 61/323,792 entitled, "Method and System For Control Of Autonomous Aerial System via GSM Cellular Network", filed on Apr. 13, 2010 and U.S. Provisional Application No. 61/323,750 entitled, "Method and System For Establishing A Short-term Network Mesh Using Miniature Autonomously Guided Parafoils", filed on Apr. 13, 2010 and U.S. Provisional Application No. 61/323,675 entitled, "Method and System For Vertical Replenishment Of Naval Vessels Via Precision Guided Airdrop", filed on Apr. 13, 2010 all of which are also hereby incorporated by reference.

FIELD OF INVENTION

The field of invention pertains to guided aerial vehicles and more specifically to automatically guided parafoil directed to land on a moving target.

BACKGROUND

FIG. 1a shows a parafoil 101. A parafoil is a wing shaped parachute capable of steerable, controlled descent. Essentially, the parachute aspect of the parafoil causes the parafoil to exhibit a gradual descent, while, the wing aspect of the parafoil permits the parafoil to have a guided flight path. The flight path of a parafoil can be controlled by tugging/releasing lines coupled to the left and right trailing edges of the parafoil. Specifically, as observed in FIG. 1b, a parafoil can be made to turn to the left if the left trailing edge line 102 is tugged/pulled. Likewise, referring to FIG. 1c, a parafoil can be made to turn to the right if the right trailing edge line 103 is tugged/pulled. A parafoil can even be made to momentarily rise, or at least change its pitch upward if both the left and right trailing edge lines 102, 103 are tugged/pulled.

Parafoils have been used for guided drops as a consequence of the ability to control their flight path. In order to successfully land a parafoil at or near some target, however, an individual or person is needed to control the trailing edge lines 102, 103 so as to guide the parafoil with the requisite accuracy. Said another way, the intelligence and sensory abilities of the human brain are needed to manipulate the trailing edge lines 102, 103 of the parafoil in view of the location of the target, the height of the parafoil, the forward and transverse speeds of the parafoil, the roll, yaw and pitch of the parafoil and the presence of winds.

Various applications can be envisioned, however, for automatically guided parafoil drops. For instance, consider a situation where a team of catastrophe the ability to simply attach the needed supplies to the parafoil with some computerized intelligence to control the parafoil's trailing edge lines so as to automatically guide the parafoil and its payload in the vicinity of the surveyors/worker/soldiers would obviate the need for keeping skilled parachutists at the ready in case such a need for supplies arises. Moreover, even if skilled parachutists are available and at the ready, a parachutist would be delivered along with the payload. Without the same skills as the surveyors/workers/soldiers, the parachutist is apt to become a burden for the surveyors/workers/soldiers after the payload has been successfully delivered.

BRIEF DESCRIPTION OF THE DRAWINGS

A better understanding of the present invention can be obtained from the following detailed description in conjunction with the following drawings, in which:

FIGS. 13a and 13b pertain to an attempt to land a parafoil on a moving target;

DETAILED DESCRIPTION

1.0 Parafoil, Payload Assembly and Control Unit

Figure 1A:
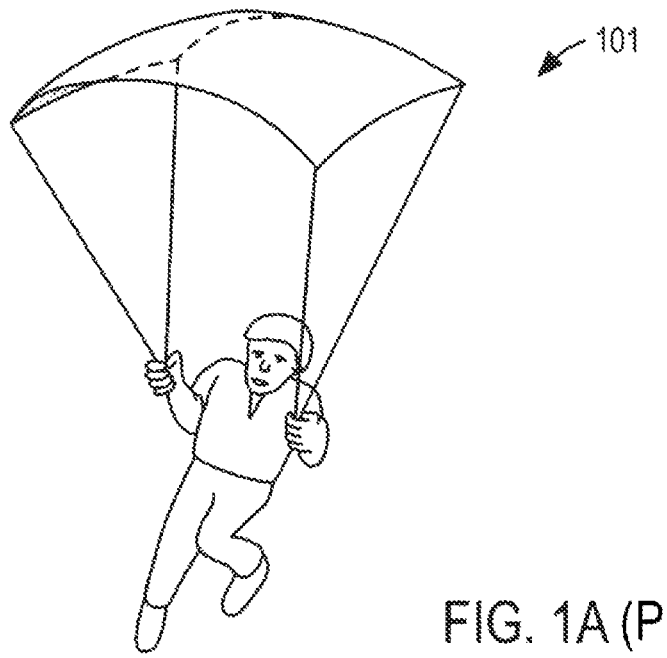
FIGS. 1a,b,c depict a parafoil.
Figure 1B:
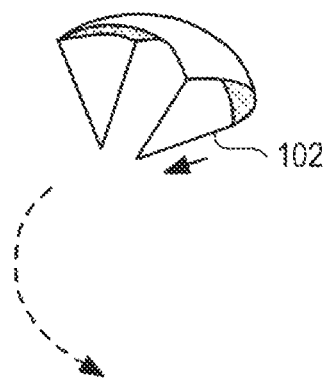
Figure 1C:
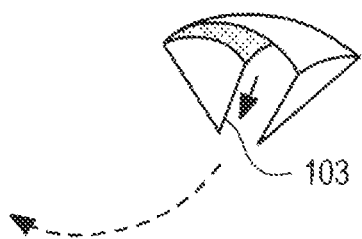
Figure 2:
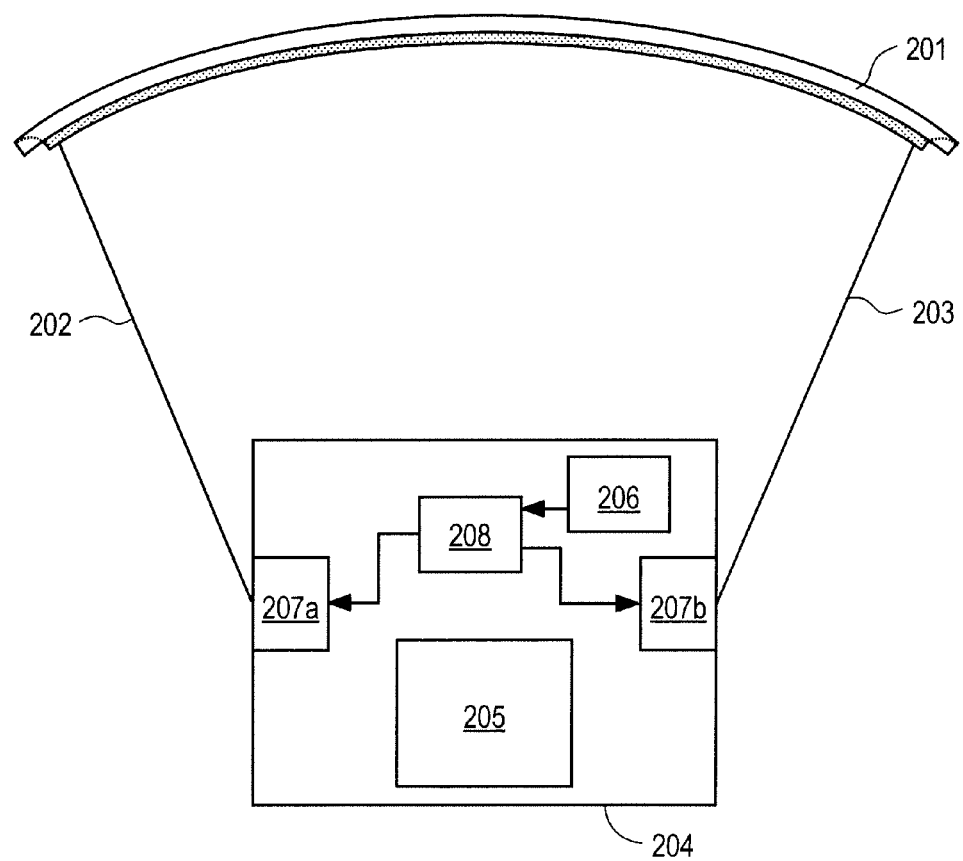
FIG. 2 shows an embodiment of a parafoil 201 and payload assembly 204.

FIG. 2 shows an embodiment of a parafoil 201 and payload assembly 204 sufficiently capable of self guidance in a number of situations. The payload assembly 204 includes: i) the payload to be delivered 205 (e.g., supplies to be delivered to workers/soldiers on the ground); ii) sensors 206 to detect, for example, the parafoil's speed and orientation; iii) motors (e.g., actuators) 207a,b to "rein in" and "rein out" the left and right trailing lines 202, 203 in accordance with the parafoil's currently desired direction and orientation; and, iv) a control unit 208 having electronic circuitry to apply the appropriate control signals to the electronic motors 207a,b in response to signals received by the control unit 208 from the sensors 206. Here, payload assembly 204 may be any mechanical package that physically integrates the payload 205, sensors 206, motors 207a,b and control unit 208 as a cohesive whole.

Figure 3:
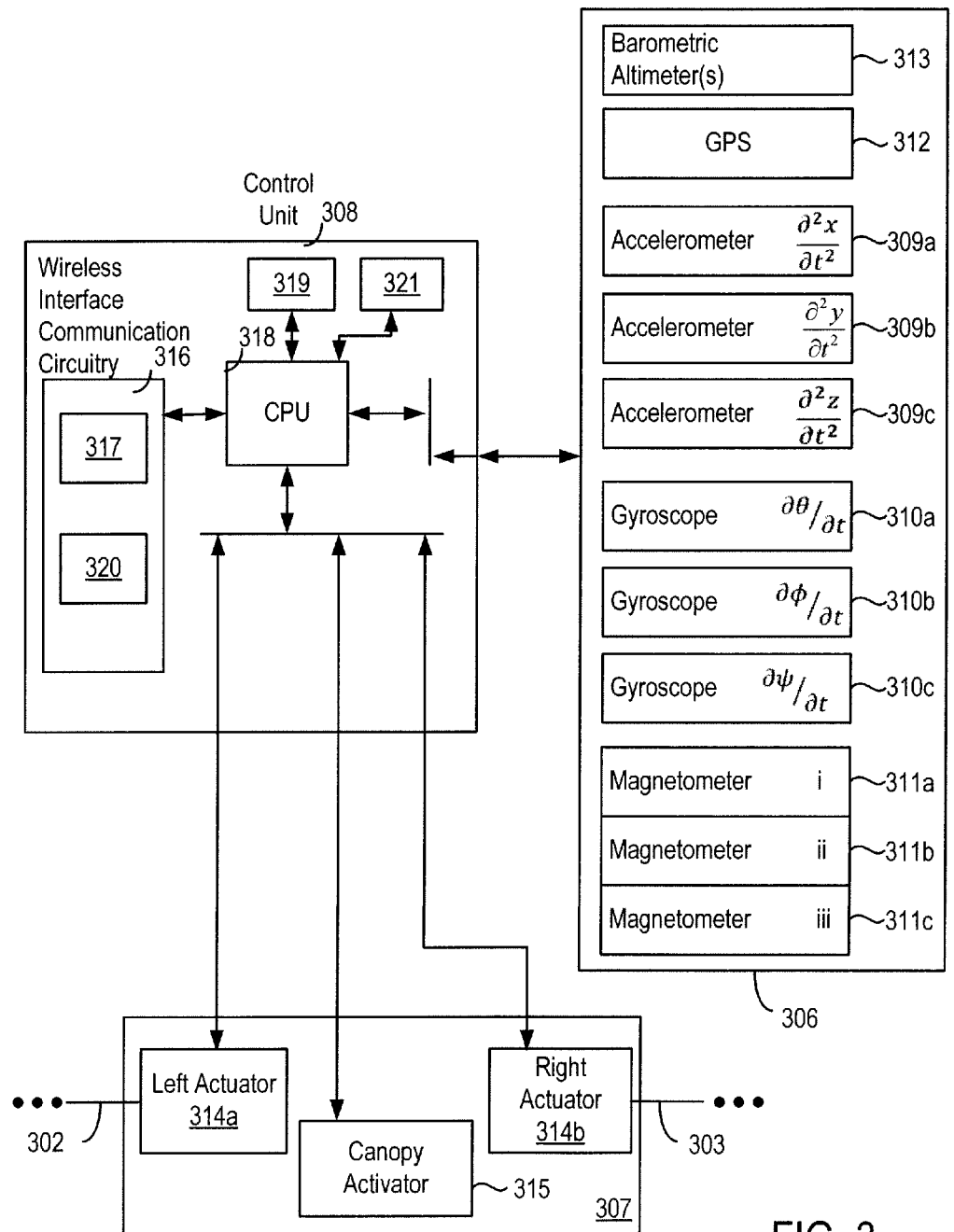
FIG. 3 shows an embodiment of the sensors, motors and control unit within a payload assembly.

FIG. 3 shows an embodiment of the sensors 306, motors 307 and control unit 308. In the embodiment of FIG. 3a, the sensors 306 include an internal navigation system (INS) sensor set 312 including: i) three accelerometers 309a,b,c to measure linear acceleration in three different, respective directions (x, y, z); ii) three rate gyroscopes 310a,b,c to measure angular velocity (dθ/dt, dϕ/dt, dψ/dt) along three different axis; and, iii) three magnetometers 311a,b,c to sense a three dimensional vector v that defines the parafoil's present pointing. The sensors 306 also include the Global Positioning System (GPS) receiver 312 (to measure the parafoil's location) and barometric altimeter 313 to measure the parafoil's altitude. As is known in the art, an accelerometer output can be integrated once over time to produce a measurement of velocity traveled in the same direction that the acceleration was measured. Likewise, the velocity can be integrated over the same time to determine the distance traveled in the same direction. Similarly, angular velocity as provided by the rate gyroscopes can be integrated over time to determine the number of degrees that have been rotated about the respective axis over the same time period.

The motors 307, in an embodiment, include a set of actuators 314a,b for the left and right trailing edge lines 302, 303. A third actuator 315 is used to release a canopy of the payload assembly after it is dropped from an aircraft so that the parafoil can deploy. The embodiment of FIG. 3 also depicts the control unit 308 as including wireless communication circuitry 316. Specifically, the control unit 308 includes circuitry 317 to communicate with a local carrier's network (such as GSM circuitry 317 to communicate with a local carrier's GSM network). The wireless communication circuitry 316 may also include wireless circuitry 320 to communicate with a proprietary wireless network or link (e.g., established by the operators of the parafoil).

As observed, the control unit 306 represents a computer system having a processing core 318 (e.g., microprocessor) and with the sensors 306, motors 307 and wireless communication circuitry 316 acting as some form of the computing system's I/O. As shown, the sensors 306, motors 307 and wireless communication circuitry 316 have their own dedicated interfaces (e.g., busses) to the processing core 318 but conceivably communications between the processing core 318 and the different units 306, 307, 316 may be shared over a same interface in various combinations. The processing core 318 is coupled to a volatile memory 319 (e.g., DRAM or SRAM) and flash memory 321. The software executed by the processing core 318 is stored in flash memory 321 and loaded into volatile memory 319 when the control unit is first powered on (in an embodiment, well before the unit is dropped from an airplane). Thereafter the processing core 318 executes the software from volatile memory 319.

2.0 Control System

Figure 4:
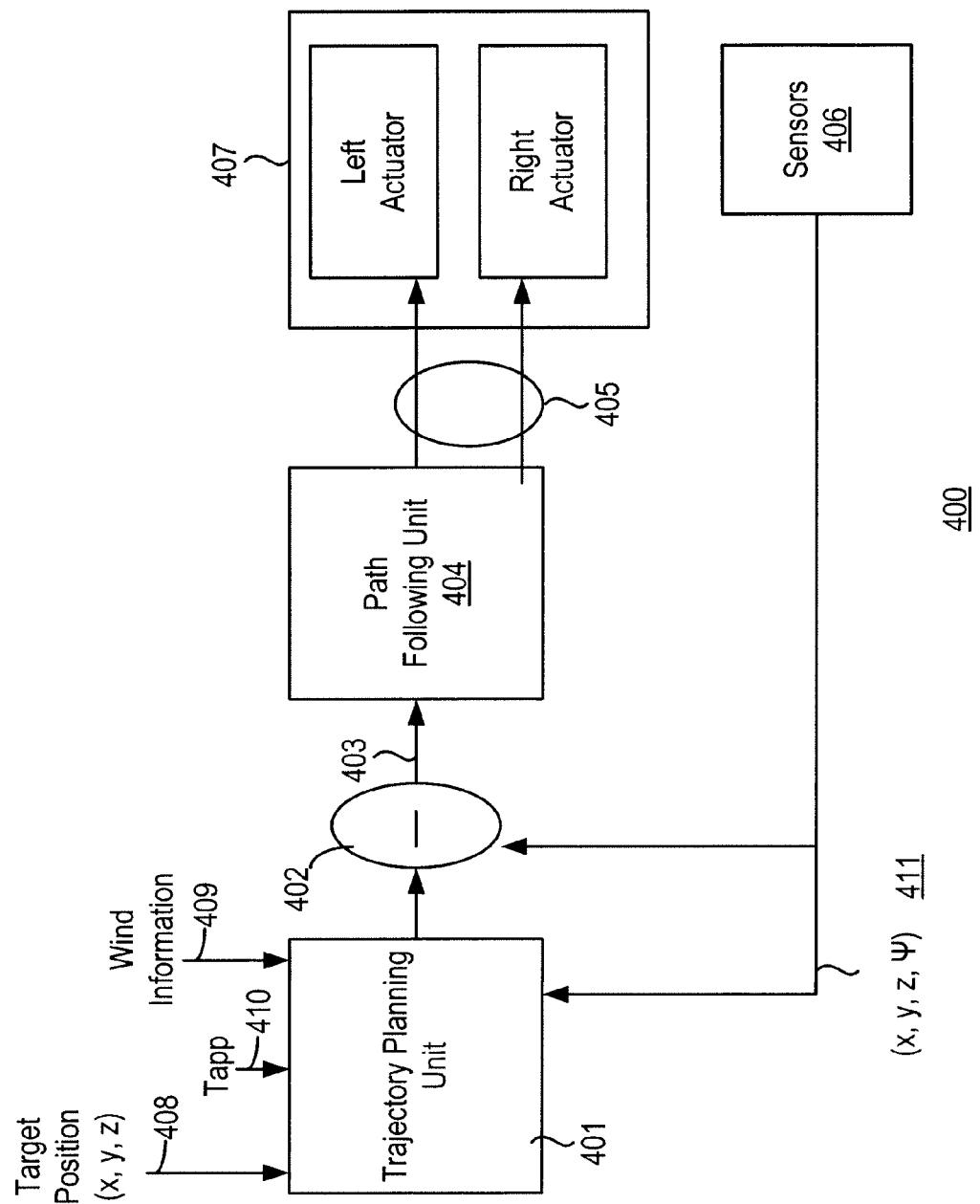
FIG. 4 shows a control system 400 implemented by the control unit's computer system.

FIG. 4 shows a control system 400 implemented by the control unit's computer system to automatically guide the parafoil's flight. The control system of FIG. 4 includes a trajectory planning unit 401, a difference unit 402, a path following unit 404, the sensors 406 and the motors 407. The trajectory planning unit 401 is responsible for determining the overall flight path of the parafoil. The flight path essentially defines the parafoil's desired location and orientation at a moment of time. The sensors 406 measure the parafoil's actual location and orientation at the moment of time. The difference unit 402 determines an error signal 403 defined as the difference between the desired and actual location/orientation of the parafoil.

When there is no difference between the desired and actual location of the parafoil, the parafoil is "on track" and therefore no error signal exists. In this case, the parafoil's trailing edge lines do not need to be adjusted. By contrast, when a difference exists between the desired and actual location/orientation of the parafoil, the difference unit 402 produces a substantive error signal 403 that the path following unit 404 reproduces into one or more control signals 405 that are presented to either or both of the motors 407 to adjust the trailing edge lines in a manner that brings the parafoil closer to the desired location/orientation. In various embodiments the trajectory planning unit 401, difference unit 402 and path following unit 404 are implemented with software program code that is executed by the parafoil's processing core. Other implementations may impose various functions performed by these units in hardware either entirely or partially.

In an embodiment a model predictive control (MPC) approach is utilized based on a Single-Input Single Output (SISO) discrete system of the form:

$$s_{k+1} = As_k + Bu_k \qquad \text{Eqn. 1a}$$

$$p_k = Cs_k \qquad \text{Eqn. 1b}$$

where: 1) k is the present state of the parafoil and payload assembly (hereinafter, "parafoil"); 2) k+1 is the next state of the parafoil; 3) A, B and C are matrices that describe the parafoil dynamics; 4) $s_k$ is a vector that describes the present state of the parafoil mechanical system in terms of its roll, change in roll with respect to time, yaw and change in yaw with respect to time; 5) $u_k$ describes the control signals being applied to the parafoil's motors in the present state; and, 6) $y_k$ is the parafoil's trajectory in the present state (that is, the path along which the parafoil is currently headed).

As provided in Appendix A of the instant application, the above system can be solved for $u_k$ as a function of the parafoil's currently desired trajectory $w_k$. Thus, for a present parafoil state k, appropriate control $u_k$ to be applied to the parafoil's trailing line motors can be determined to keep the parafoil's path along its desired path $w_k$.

Generally, the ability to calculate proper control signals for a desired trajectory is well known in the art. That is, given a desired flight path and an actual deviation from the desired flight path, it is well known (or can be readily determined) how to adjust a parafoil's trailing edge lines to bring the parafoil closer to the flight path. What has heretofore not been known is a generic algorithm or set of algorithms, executable by the parafoil as it is descending, for determining the parafoil's desired flight path to a specific target area where the algorithm takes into account various factors such as the precise location of the target relative to the parafoil when the parafoil is dropped, the altitude at which the parafoil is dropped and the applicable winds. In this respect, the ensuing discussion will focus primarily on algorithms executed by the trajectory planning unit 401.

As described in more detail further below, various embodiments exist as to the manner in which the algorithms executed by the trajectory planning unit account for the presence of winds. According to one perspective, the parafoil is purposely landed into the wind (for the sake of a "soft" landing). As a consequence, the strategy of the parafoil's flight plan is based on establishing a reference inertial trajectory with the major axis being aligned with the direction of prevailing/anticipated/known ground winds. The aloft winds component in this direction dictates the flight plan's logistics, while the crosswind component (measured or unmeasured) is considered as a disturbance. According to one embodiment, the prevailing wind component, estimated at current altitude is assumed to have constant magnitude through the entirety of the parafoil's descent. According to another embodiment the wind is assumed to linearly weaken in terms of magnitude over the course of the parafoil's descent. According to a third embodiment, the wind is assumed to weaken logarithmically over the course of the parafoil's descent. For simplicity, the first embodiment (in which the wind is assumed to have constant magnitude over the course of the parafoil's descent) will be described to provide an overall view of the flight path determination strategy. Subsequently, modifications will be introduced to this basic approach to account for more sophisticated wind modeling.

As observed in FIG. 4, the trajectory planning unit 401 receives input information in the form of the target's position 408 (e.g., x, y, z coordinates of the target's position or just x, y if the z position of the target is assumed to be zero) and information concerning the applicable winds 409 and the amount of time ($T_{app}$) the parafoil is to spend on its "final approach" 410. As will be discussed further below, the parafoil's flight path as determined by the trajectory planning unit 401 has a plurality of different legs, where, the final approach is the last leg. Here, the final approach time input 410 corresponds to a user input that is set before the parafoil is dropped. In an embodiment where the target is fixed (i.e., is not moving), the target position 408 is also a static input that can be entered before the parafoil is dropped.

The set of inputs received by the trajectory planning unit 401 also include a dynamic component in the form of a feedback path 411 that exists from the sensors 406 to the trajectory planning unit 401. In an embodiment, the sensor information that is fed back to the trajectory planning unit 401 at least includes the x, y, z spatial position of the parafoil and its horizontal pointing direction or "yaw" ($\psi$) (although not all of these parameters are necessarily used at all times during all flight path phases). Here, the flight path determined by the trajectory planning unit 401 need not be static. That is, once a first flight path is determined, the trajectory planning unit 401 is free to change or adjust the flight path as circumstances warrant.

Figure 5:
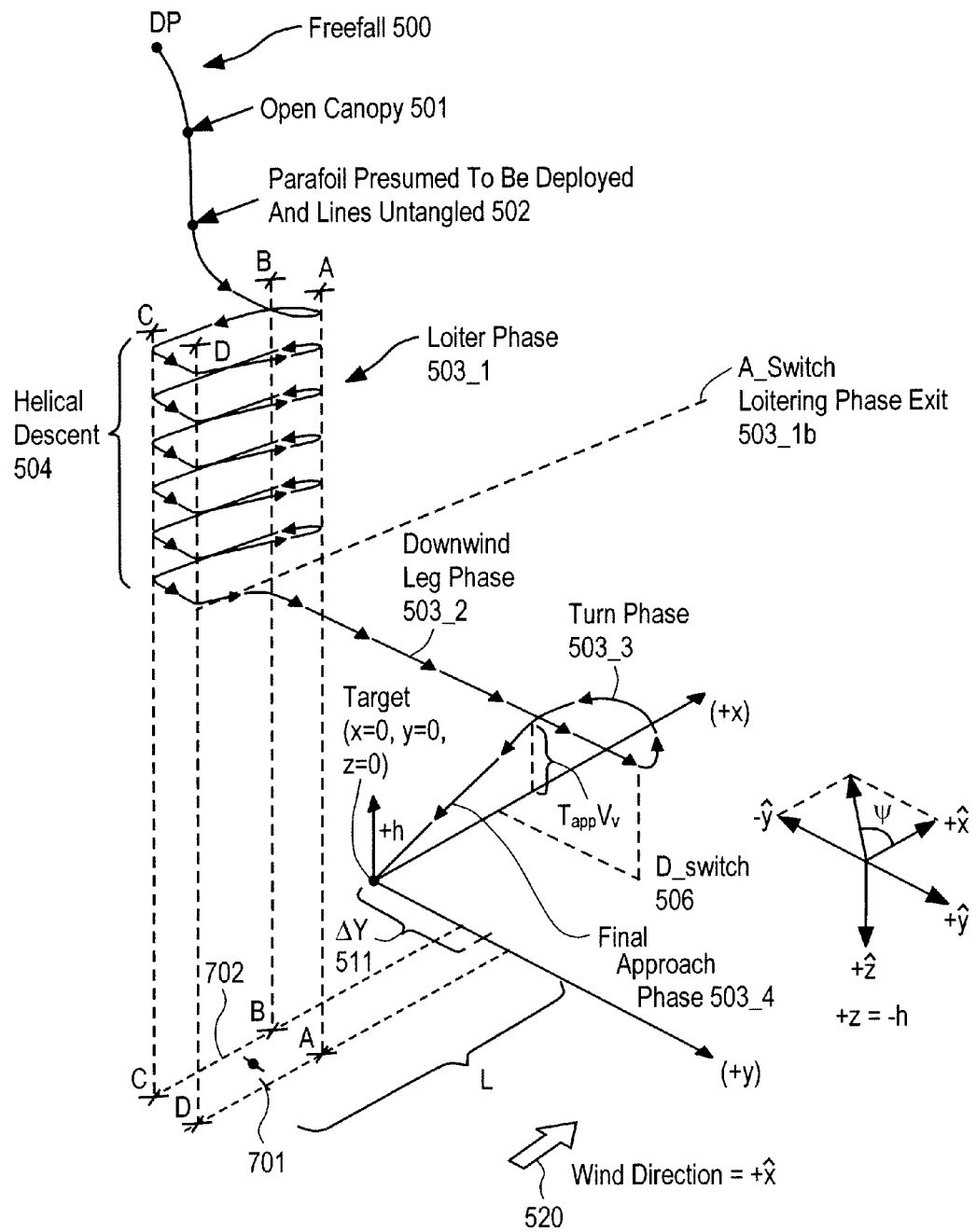
FIG. 5 shows an embodiment of a trajectory plan.

Referring to FIG. 5, in an embodiment, the control unit is turned on and operational before the payload assembly with packed parafoil is dropped from an airplane, helicopter or other airborne vehicle at drop point DP. The parafoil is purposely dropped upwind from the target (i.e., so that the wind will initially move the parafoil closer to the target). From the drop point DP, the payload assembly freefalls 500 for a set period of time. During the freefall 500 phase, the flight path control system of FIG. 4 is essentially not activated. Rather, after a first preset time (e.g., 3 seconds) to allow the falling payload assembly to gain some distance from the airborne vehicle it was dropped from, the payload assembly's canopy is opened 501 to release the parafoil. After another preset time period (e.g., 4 seconds) of additional free fall the parafoil is presumed to be fully deployed and its trailing lines untangled 502.

At this point, the flight path control system of FIG. 4 becomes operational and in control of the parafoil's flight path for the remainder of the parafoil's descent. As observed in FIG. 5, the flight path as determined by the trajectory unit 401 includes four major phases 503_1 ("loiter"), 503_2 ("downwind leg"), 503_3 ("turn"), and 503_4 ("final approach"). The flight path is essentially a high level strategy that is believed to be workable across a range of situations and environments. According to one perspective of the strategy, the parafoil is deliberately landed into the wind on the final approach leg 503_4. That is, when the parafoil is on the final approach 503_4 part of its flight path, the parafoil's flight path direction is opposite that of the wind's direction 520.

A rationale for this approach is that when heading into the wind, the responsiveness of the parafoil to control input on its trailing edge lines is enhanced (as compared when the parafoil is heading with the wind) and it provides for a slower landing of the parafoil on the ground so as to protect the payload from the shock of landing. After exiting the initial loitering phase 503_1b, the parafoil sails with the wind along the downwind leg 503_2 to a point "D_switch" 506 along the x axis, at which point, the parafoil enters the turn phase 503_3 to turn the parafoil onto its final approach path 503_4.

2.1 Loitering Phase

Upon entering the loitering phase 503_1, the trajectory planning unit maps out a helical descent pattern 504. In an embodiment the helical descent pattern 504 is defined by points A, B, C and D in x,y space in the proximity of the location where the parafoil is dropped. Each time the parafoil reaches a point sufficiently proximate to one of points A, B, C and D in xy space, the parafoil turns to effect the helical descent. In a further embodiment, points ABCD define a rectangle or square in xy space where two of the rectangle's/square's sides are arranged to be parallel with the wind direction 520. The wind direction 520 is entered into the flight control system either before the payload assembly is dropped from the airborne vehicle, or, communicated to the flight control system (e.g., via the control unit's wireless network interface(s)) during its free fall or early loitering state). Points A, B, C, D may also be similarly entered into the flight control system (based on anticipated parafoil dynamics and/or tactical conditions).

During the helical descent 504 the parafoil accomplishes a number of tasks including: 1) gaining an initial understanding of the parafoil's positioning relative to the target; 2) estimating its current (weight-specific) performance of the payload system, specifically its forward speed $V_h$; 3) measuring the wind at its altitude; and, 4) calculating the altitude A_switch 503_1b at which the loitering phase 503_1 ends and the downwind leg phase 503_2 begins.

Figure 6:
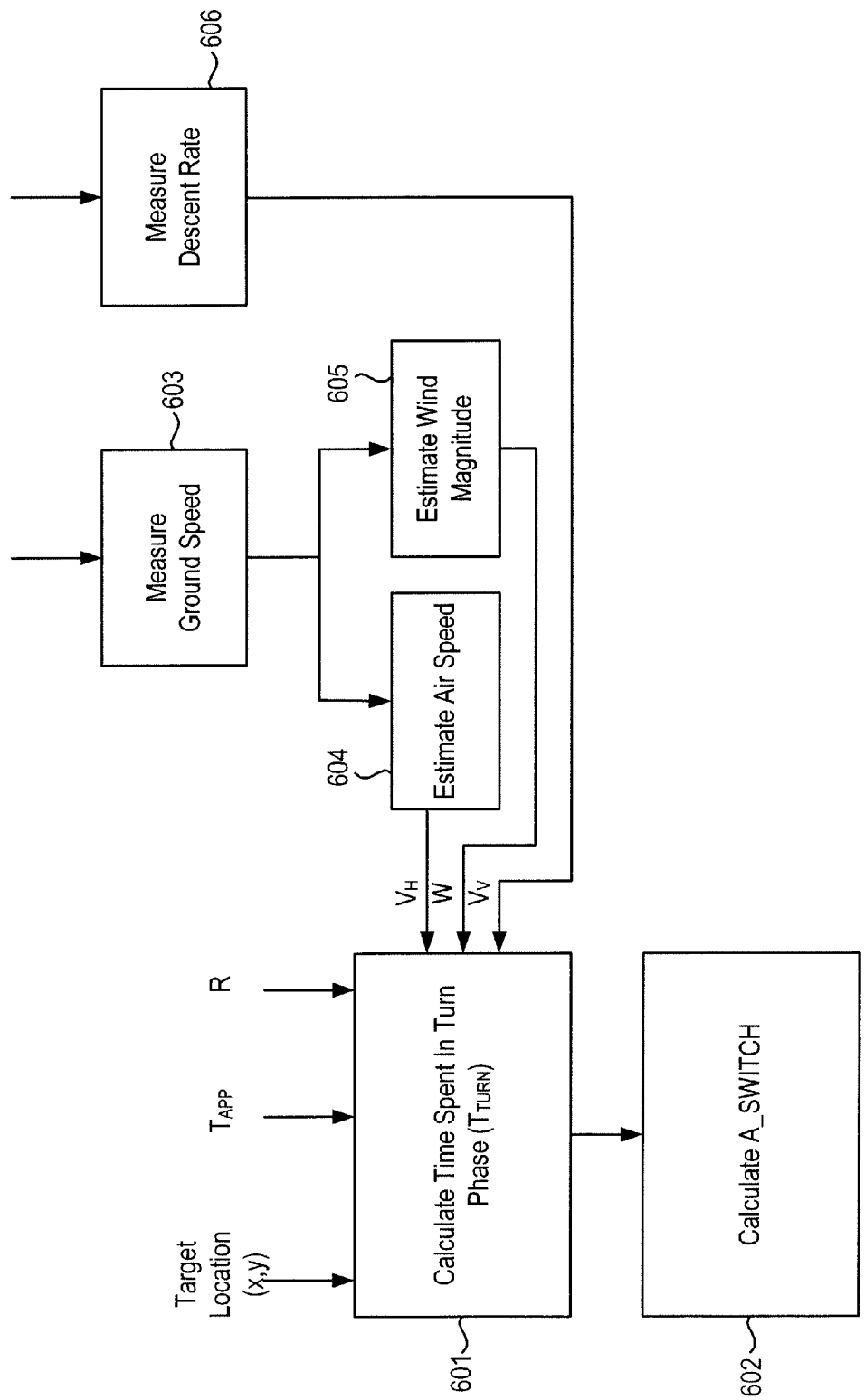
FIG. 6 shows an embodiment of a methodology executed by a trajectory planning unit during a loitering phase.

FIG. 6 shows an embodiment of the algorithm executed by the trajectory planning unit 401 while in the loitering phase in more detail. As observed in FIG. 6, based on the estimate of $V_h$ the trajectory planning unit calculates the time $T_{turn}$ spent in the turn phase 503_3 and A_switch 507. Specifically, in an embodiment, first a value of $T_{turn}$ is calculated 601, then, a value for A_switch is calculated 602. While these calculations are ensuing, the actual output of the trajectory planning unit 401 corresponds to the ABCD helical descent pattern 504, so that the trailing edge lines of the parafoil are adjusted as appropriate to keep the parafoil on the ABCD helical descent track.

As the parafoil descends in the ABCD helical pattern the control unit measures the parafoil's ground speed 603 and, based on these ground speed measurements, estimates the parafoil's air or forward speed ($V_h$) 604 and the magnitude of the wind (W) at its present altitude 605. The descent rate ($V_v$) is also calculated 606. As observed in FIG. 6, each of these determinations 604, 605, 606 as well as the target location, the preconfigured time of the parafoil's final approach ($T_{app}$) and the radius (R) of the turn in the turn phase 503_3 can be used to calculate $T_{turn}$ and A_switch 507. Before discussing these calculations, however, embodiments for making each of the forward speed 604, wind 605 and descent rate 606 calculations will be discussed first.

Figure 7:
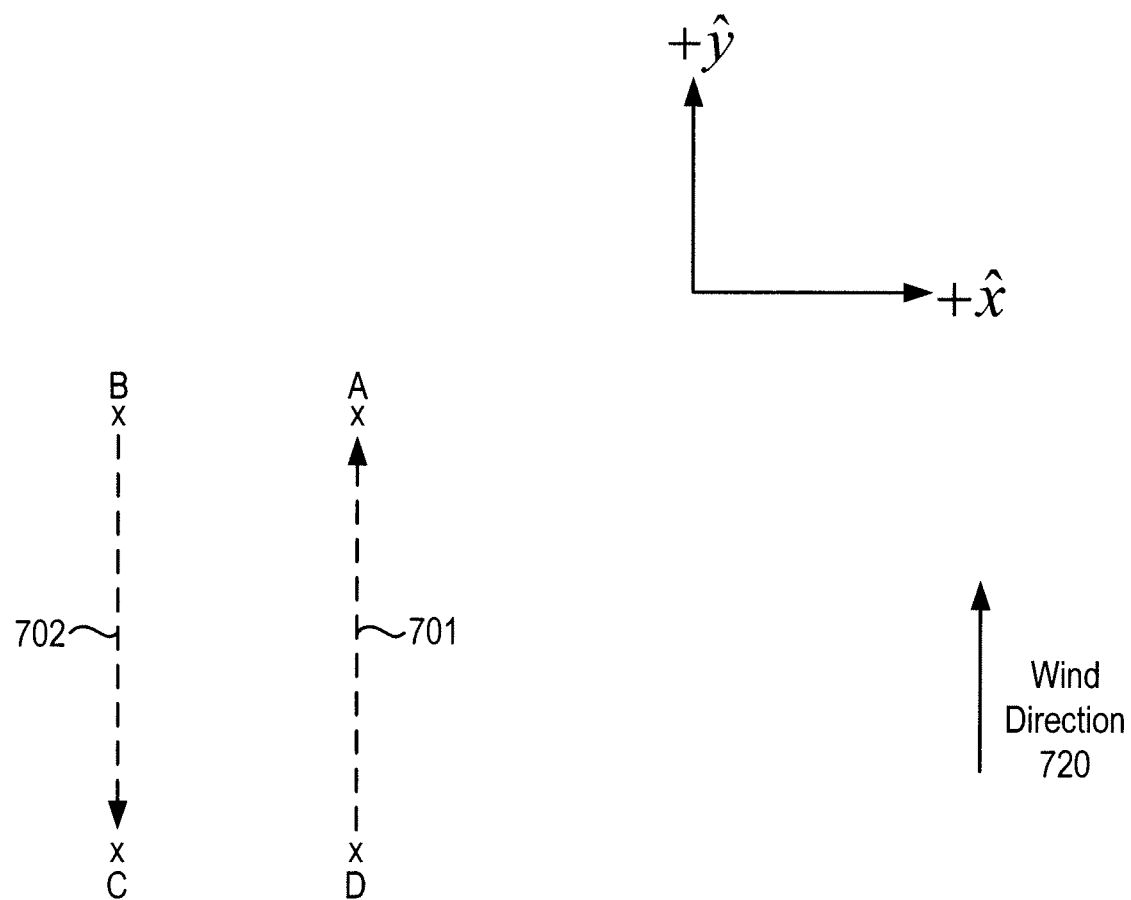
FIG. 7 diagrams an approach for measuring forward speed and wind magnitude.

FIG. 7 pertains to the trajectory planning unit's ground speed 603 and wind 604 measurements. In various embodiments, the direction of the prevailing/expected ground wind is entered into or communicated to the parafoil's control unit (e.g., prior to the payload assembly being dropped from the airborne vehicle or through one of the control unit's wireless interfaces after it is dropped). While loitering, the parafoil's control unit determines the prevailing winds along the downwind direction and can also determine the crosswind (much smaller) wind component, which may be useful during the final turn.

With the direction of the ground wind (desired landing direction) 520 being known, the trajectory planning unit is able to establish: 1) the direction of the final approach 503_4; 2) the direction of the downwind leg 503_2 and turn 503_3; and, 3) the orientation of the "legs" of the loitering phase's ABCD helical descent. As such, when the loitering phase 503_1 first begins, the trajectory planning unit 401 defines the ABCD helical pattern with straight "out" and "back" legs 701, 702 that run parallel to the direction 720 of the wind.

During its descent in the loitering phase, the parafoil will run through one or more straight "out" and "back" legs 701, 702 of the helical descent. During the run of the parafoil along one of these legs, over time, the trajectory planning unit presents values that correspond to x, y positions along the leg so the parafoil follows the planned leg path. When the parafoil reaches the end of a leg, the trajectory planning unit presents an output that corresponds to a turn so the parafoil can begin to approach its next leg in the pattern. During each pass through a downwind or upwind leg 701, 702, the trajectory planning unit measures its ground speed 603 in the direction of the leg. Here, the ground speed of the parafoil in the downwind legs 702 should be faster than the ground speed of the parafoil along the upwind legs 701.

The parafoil's air speed ($V_h$) and the magnitude of the wind (W) can be determined from the opposing measured ground speeds. Specifically, $$(W+V_h)=V1=\text{ground speed measured in the downwind } (+x)\text{direction} \quad \text{Eqn. 2a}$$

$$(V_h-W)=V2=\text{ground speed measured in the upwind } (-x)\text{direction} \quad \text{Eqn. 2b}$$

such that $$V_h=(V1+V2)/2 \quad \text{Eqn. 3}$$

$$W=V1/2-V2/2 \quad \text{Eqn. 4.}$$

Multiple wind measurements can be taken through multiple loops of the helical descent (e.g., and averaging them) or only a single wind measurement can be taken through a single loop. Similarly, the crosswind component of the current winds can be estimated while the parafoil travels along two other legs (leg CD and led AB in FIG. 7). This may be important if the landing is scheduled differently than into the wind. This latter case may be applicable to landing onto a moving target (platform) or delivering payload from a specified direction, not necessarily aligned with a ground wind.

Referring back to FIG. 6, the descent rate 606 ($V_v$) can also be calculated by measuring the parafoil's change in altitude over a period of time. Here, the barometric altimeter readings of INS and/or GPS readings can be used to determine altitude.

With the estimate provided by Eqn. 3, the time $T_{turn}$ expected to be spent in the turn phase 503_3 can be estimated 601 as $$T_{turn}=\pi R/V_h \quad \text{Eqn. 5}$$

where R is an estimated radius of the turn which, in an embodiment, is a parameter that is entered by a user into the control unit. In another embodiment, the control unit sets an initial value of R=ΔY/2 where ΔY is the lateral distance along the y axis 511 between the target and the approximate position of the parafoil while loitering. Here, Eqn. 5 essentially corresponds to the time spent in a 180 degree turn with radius R and air speed $V_h$ with a constant turn rate.

With numerical values being assigned to each of $T_{turn}$, $V_h$, $V_v$, and $T_{app}$, the parafoil can determine 602 the altitude A_switch at which it exits the loitering phase 503_1 and enters the downwind phase 503_2 as:

$$A_{switch} = V_v^* \frac{L + V_h^*(T_{turn} + 2T_{app}^{des})}{W - V_h^*} \quad \text{Eqn. 6}$$

where, in Eqn. 6, L is the distance separating the parafoil and the target along the x axis. Said another way, L is the x axis intercept of the parafoil current position. As drawn in FIG. 5, L is shown approximately as of the moment the parafoil exits the loitering phase. The distance of L "shortens" however as the parafoil draws nearer the target along the x axis in the downwind phase 503_2. A theoretical discussion and derivation of Eqn. 6 above is provided in Appendix B.

2.2 Downwind Leg Phase

In an embodiment, once the trajectory planning unit recognizes that the parafoil has descended to an altitude of z=A_switch, the trajectory planning unit switches phases from the loitering phase 503_1 to the downwind leg phase 503_2. In so doing, the trajectory planning unit changes the desired path of the parafoil from the helical ABCD descent with a line that runs along the x axis positioned at the y axis location of +2R (notably, in situations where the parafoil is to make a right turn in the turn phase 503_3 rather than a left turn, the line is positioned at the y axis location of −2R). As such, while in the downwind leg phase 503_2, the parafoil simply tracks to the correct y axis location and then, keeping the y axis location fixed as best as practicable, follows the +x axis while descending.

During its descent along the x axis (during the downwind leg phase 503_2), the trajectory planning unit continually updates the current winds calculates the position D_switch at which the parafoil should exit the downwind phase 503_2 and enter the turn phase 503_3. Here, D_switch is the distance along the x axis between the parafoil and the target at which the parafoil should begin the turn phase. D_switch can be expressed as $$D_{switch} = -\frac{\hat{z}(\hat{V}_h^{*2} - \hat{W}^2) + \hat{V}_h^*\hat{V}_v^*T_{turn}(\hat{V}_h^* - \hat{W}) + \hat{x}\hat{V}_v^*(\hat{V}_h^* + \hat{W})}{2\hat{V}_h^*\hat{V}_v^*} \quad \text{Eqn. 7}$$

Notably, the above expression for D_switch is a function of: 1) z, the parafoil's "current" altitude; and 2) x, the parafoil's "current" position along the x axis.

Figure 8:
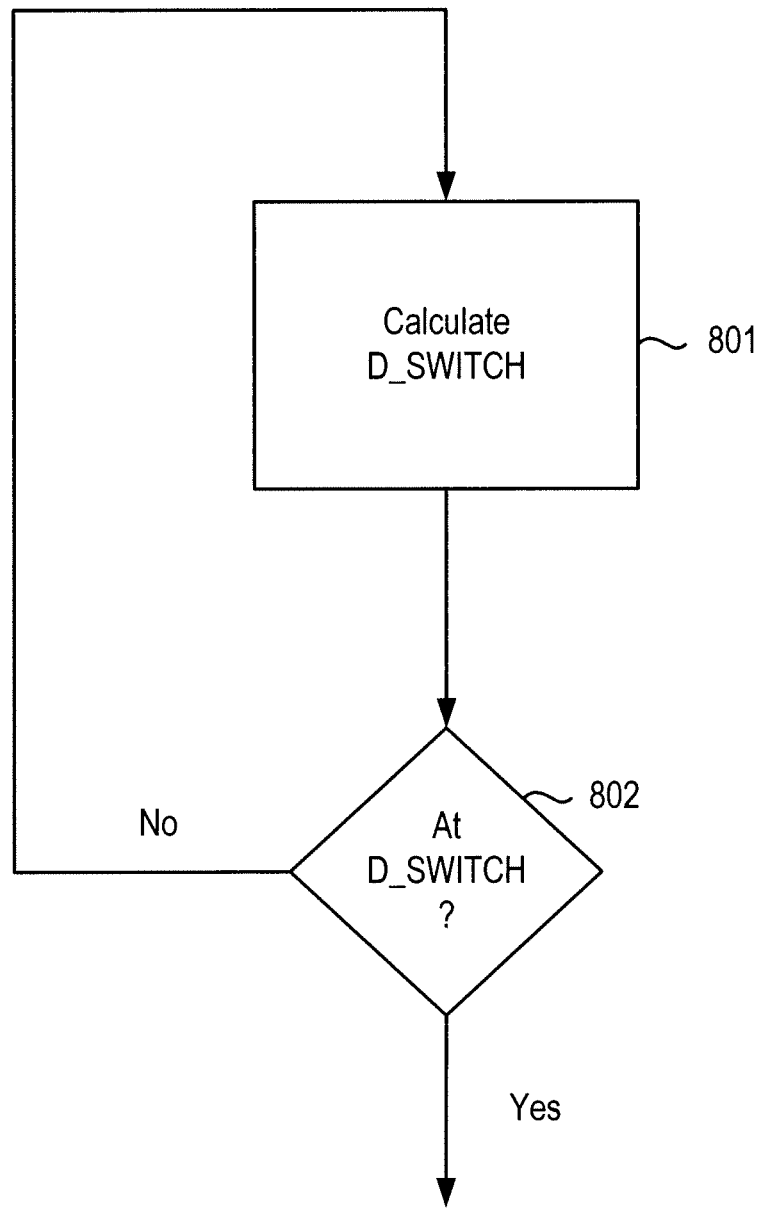
FIG. 8 shows an embodiment of a methodology executed by a trajectory planning unit during a downwind phase.

Recalling the above definitions of D_switch and L, note that the parafoil should begin the turn phase when, substitution of the x and z parameters describing its current position into Eqn. 7 yields D_switch=L=parafoil's current x axis position. As such, as observed in FIG. 8, during the parafoil's descent along the downwind leg 503_2, the trajectory planning unit repeatedly calculates 801, 802 a value for D_switch as a function of its current position. The trajectory planning unit continues to estimate wind W (assuming constant $V_h$ determined via Eqn. 3) during the downwind phase and continuously substitutes updated values for them into Eqn. 7 along with the parafoil's positional information. Based on the known $V_h$ (Eqn. 3) and measured ground speed V, the current wind is determined as $$W = V - V_h \qquad \text{Eqn. 8}$$

When the latest calculated value for D_switch is recognized as being sufficiently the same as its present distance (L) along the x axis from the target, the trajectory planning unit exits the downwind leg phase 503_2 and enters the turn phase 503_3. Notably, the calculated value of D_switch can be negative indicating that the parafoil is to begin its turn before reaching the target's x axis location on the downwind leg. Appendix B also provides a derivation of Eqn. 7.

2.3 Turn Phase

As discussed above, the decisions made by the trajectory planning unit are based on various measurements (such as forward speed $V_h$ and wind magnitude W) and assumptions (such as a small magnitude for the crosswind component of the wind). Ideally there is no error in such measurements/assumptions, and, when the parafoil reaches the D_switch position and begins its turning phase, not only is the parafoil precisely where the trajectory planning algorithm "hoped" it would be, but also, the winds do not drastically change thereafter. Realistically, however, either or both of these conditions may not materialize. That is, for instance, when the trajectory planning unit decides to enter the turning phase, the parafoil may be "somewhere" in the xy plane other than its targeted location for the specific turn radius R and turn rate over time $T_{turn}$ that the parafoil's trajectory was planned around. Moreover, the winds are constantly changing, which cannot possibly be accounted for during the turn itself. Finally, sudden updrafts and downdrafts may change the descent rate (relative to the ground) and therefore ruin a major estimate of how long the system has to stay in the air.

Figure 9A:
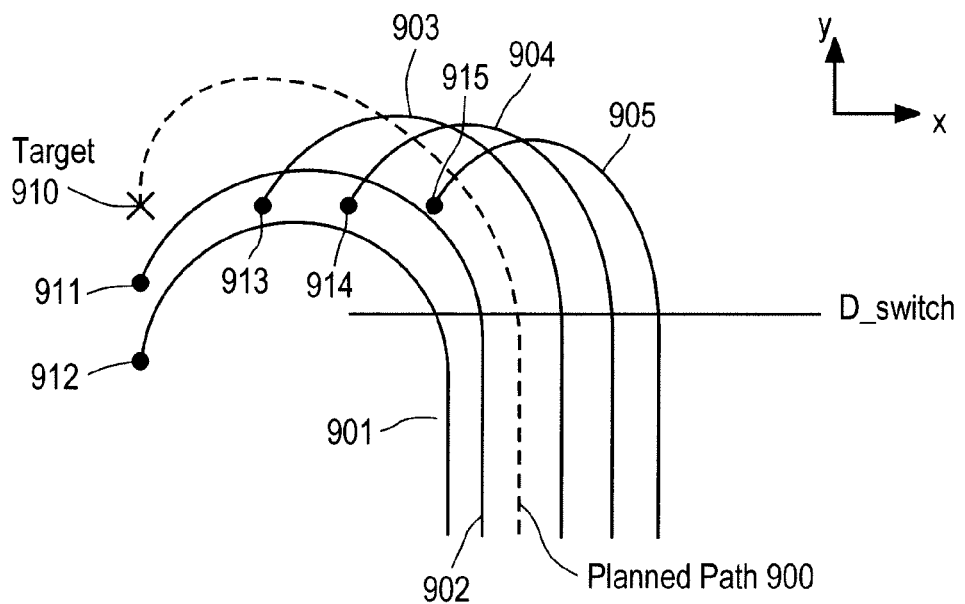
FIGS. 9a,9b,9c pertain to an embodiment of a methodology executed by a trajectory planning unit during a turn phase.
Figure 9B:
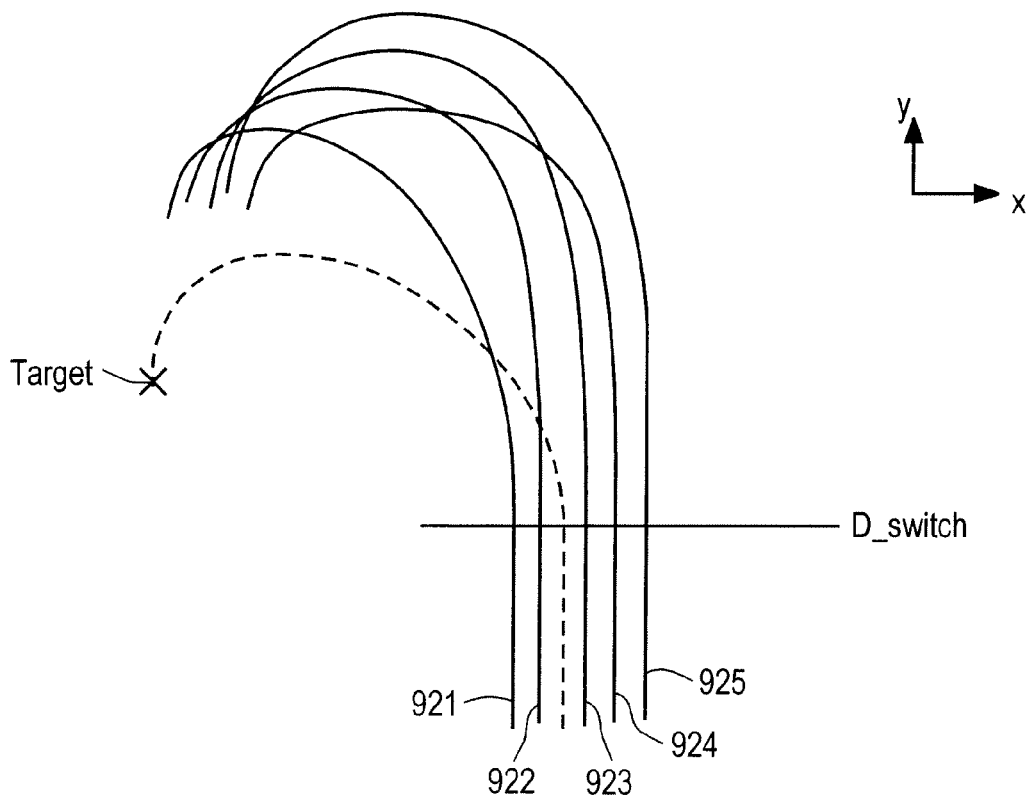

FIG. 9a shows an example of the former problem (entering turn phase in other than ideal x,y position). Here, representative actual paths 901-905 of the parafoil in the xy plane are different than the ideal planned path 900. These deviations from the ideal path 900 can result in unwanted error between the target location 910 and the corresponding actual landings 911-915. FIG. 9b shows an example of the later problem (sudden change in wind magnitude W). In this case, the wind has suddenly increased which effectively blows the parafoil short of its target in representative actual paths 921-925. In each of the representative actual paths 901-905 and 921-925 of FIGS. 9a and 9b, the trajectory planning unit maps out a simplistic a 180 degree turn over radius R with constant angular rate over $T_{turn}$.

Figure 9C:
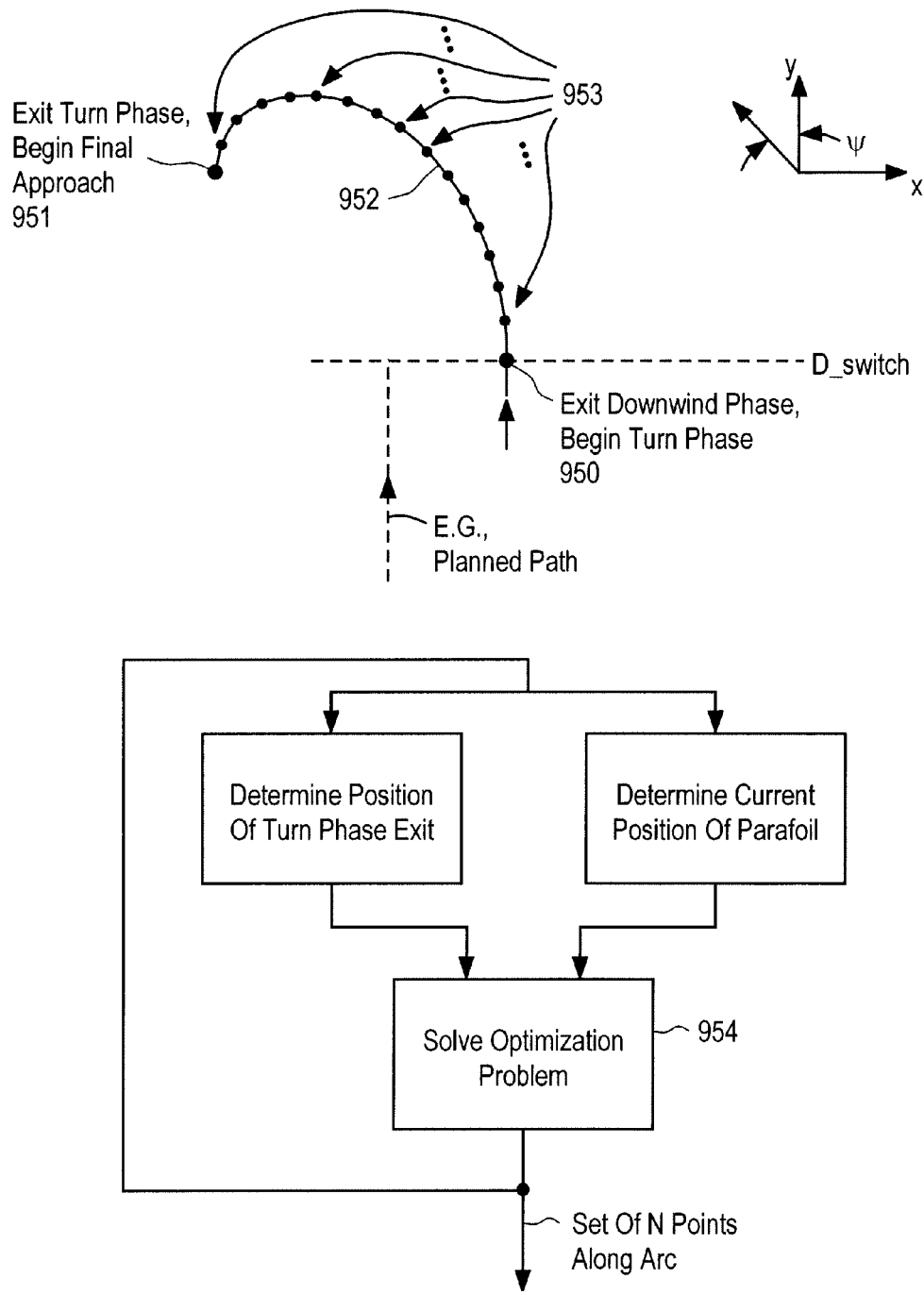

FIG. 9c shows an improved approach in which the trajectory planning unit calculates an optimum turn based on its current position 950 in the turn relative to the exit point 951 of the turn phase. Here, a two point boundary-value problem is solved by minimizing the "cost" of an arc 952 that spans from the parafoil's current x,y,ψ position 950 (where ψ is the parafoil's yaw angle=the angle at which the parafoil is headed or pointing along the x,y plane) to the x,y,ψ position 951 where the final approach is supposed to start. The "cost" of an arc is determined by N points 953 spaced along the arc in a certain manner and: i) determining the time spent by the parafoil traveling between the points, summing these times to represent the total time spent traversing the arc, and, taking a difference between this total time and $T_{turn}$; and, ii) determining the yaw rate (angular change of the pointing of the parafoil in the xy plane) beyond a maximum desired yaw rate from each point needed to steer the parafoil to its next point.

Here, i) above penalizes deviation of the parafoil's total turn time from $T_{turn}$; and, ii) above penalizes an excessive yaw rate ("sharp turn") needed to accomplish the turn. By formulating the cost as an optimization problem to minimize the cost, the respective positions for a set of N points along an arc between the parafoil's current position and the point where the final approach is to begin will be determined that correspond to an arc whose travel time is closest to $T_{turn}$ and that does not exhibit excessive yaw rate.

As such, as observed in FIG. 9c, the trajectory planning unit determines the position at which the final approach phase is to begin 951 (e.g., in terms of x,y,ψ), and determines its current position 952 (e.g., again in terms of x,y,ψ). With these input parameters, the trajectory planning unit then solves an optimization problem 954 to determine (e.g., x,y) positions of a set of N points 953 that define an arc 902 between the parafoil's current position 952 and the position 951 at which it is to end the turn phase. In one embodiment, the algorithm only optimizes a few parameters pertaining to the initial and final points of the turn. The optimal trajectory is determined analytically. This accelerates trajectory optimization so as to perform optimization about 100 times faster than in real time. This analytically defined inertial reference trajectory is passed to the control unit assuring that the parafoil actually follows the determined arc in flight.

Figure 10:
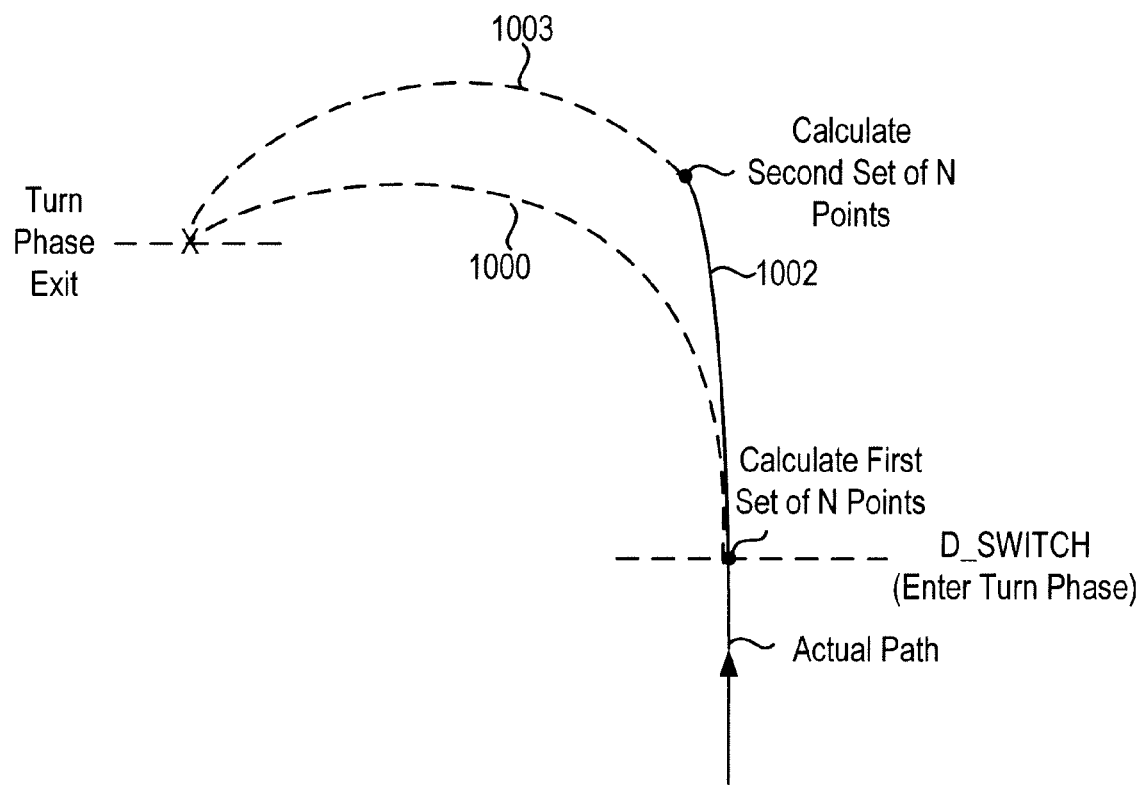
FIG. 10 pertains to a second embodiment of a methodology executed by a trajectory planning unit during a turn phase.

Notably, the trajectory planning unit is free to repeatedly calculate a new trajectory (and therefore a new set of N points) throughout the turn phase. For example, as observed in FIG. 10, upon entering the turn phase, the parafoil's trajectory planning unit calculates a first arc/set of N points 1000 that is used to define a first trajectory for the parafoil in the turn phase. Sometime later, for instance, because it is recognized that the parafoil's actual flight path 1002 has substantially deviated from the initial trajectory 1000, the trajectory planning unit recalculates a second arc/set of N points 1003 that are used to define a second trajectory for the parafoil in the turn phase. In various alternative embodiment, the parafoil automatically (e.g., periodically) recalculates its trajectory in the turn phase (e.g., without reference to its deviation from an earlier trajectory), or, only calculates a new trajectory if the parafoil's flight path breaches its intended trajectory beyond some threshold. When calculating a new trajectory in the midst of the turn phase some modification is made to the optimization problem to address the fact that the parafoil is not at the beginning of the turn phase (e.g., by comparing the total time in a proposed arc against $T_{turn} - T_{spent}$, where $T_{spent}$ corresponds to the time spent in the turn phase since the turn phase was initiated).

While optimizing the final turn trajectory, the parafoil's current x,y,ψ position 950 can be determined from the control unit's sensors (e.g., GPS or INS). The (x,y,ψ) position 951 at which the parafoil is to exit the turn phase and enter final approach is defined as:

$$FA = ((V_h - W)T_{app}, 0, -\pi) \qquad \text{Eqn. 9}$$

The final turn maneuver is a pertinent part of the guidance algorithm. The parafoil may exit loitering earlier and it can be corrected by delaying the start of the final turn. However, once the final turn maneuver has started, varying the turn rate is the only way to make final corrections to intersect the top of the final approach slope. Varying the turn rate causes the parafoil to do either a steep or shallow turn, but precisely at the top of the final approach, i.e. at the point defined by Eqn. 9 in exactly $T_{turn}$ after entering the turn. Only at this final phase can three-dimensional wind disturbances be accounted for by constant reoptimization of the maneuver, i.e. by adjusting $T_{turn}$ and producing a new yaw rate profile.

Mathematically, the optimization problem can be expressed as $$J = \left(\sum_{j=1}^{N-1} \Delta t_j - T_{turn}\right)^2 + k^{\psi}\Delta \qquad \text{Eqn. 10a}$$

$$\Delta = \max_j(0; |\dot{\psi}_j| - \dot{\psi}_{max})^2 \qquad \text{Eqn. 10b}$$

where: 1) $\Delta t_j$ is the time spent by the parafoil traveling from the jth point to the jth+1 point among the arc's N points; 2) $k^{\psi}$ is a scaling factor; 3) $\Delta$ is the change in yaw rate at a jth point among the arc's N points; and, 4) $\dot{\psi}_{max}$ is a desired maximum change in yaw rate. The analytical representation of a trajectory itself is given by $$\tau_f P'_{\eta}(\bar{\tau}) = a_1^{\eta} + 2a_2^{\eta}\bar{\tau} + 3a_3^{\eta}\bar{\tau}^2 + \pi b_1^{\eta}\cos(\pi\bar{\tau}) + 2\pi b_2^{\eta}\cos(2\pi\bar{\tau})$$

$$\tau_f^2 P''_{\eta}(\bar{\tau}) = 2a_2^{\eta} + 6a_3^{\eta}\bar{\tau} - \pi^2 b_1^{\eta}\sin(\pi\bar{\tau}) - (2\pi)^2 b_2^{\eta}\sin(2\pi\bar{\tau}) \qquad \text{Eqn. 11}$$

where $\bar{\tau} = \tau/\tau_f \epsilon [0;1]$ is a scaled abstract argument, $a_i^{\eta}$ and $b_i^{\eta}$ ($\eta$=1, 2) are coefficients defined by the boundary conditions up to the second-order derivative at $\tau$=0 and $\tau = \tau_f (\bar{\tau}=1)$, and $\tau_f$ is a varied parameter. Derivations for Eqns. 10a, 10b, 11 $\Delta t_j$, $\dot{\psi}_j$, and $\dot{\psi}_{max}$ can be found in Appendix C. Appendix D provides additional information on the final arc optimization in the case where the wind profile is not constant including a major crosswind component of the wind.

2.4 Final Approach Phase

Upon the parafoil deciding that it has reached the end of the turn phase (e.g., by recognizing $T_{turn}$ has lapsed since the beginning of the turn phase), the trajectory planning unit produces an output that causes the parafoil to head in the −x direction and maintain that direction until the parafoil lands.

3.0 Improved Wind Models

The above discussion assumed computation of $D_{switch}$ (Eqn. 7), and the final approach point (Eqn. 9) based on a constant wind in the x-direction for the entirety of the parafoil's descent. The basic optimization algorithm presented in Appendix C was also based on this assumption, specifically, in one of two kinematic equations describing the horizontal position of the parafoil $$dx/dt = V_h \cos(\psi t) + W \qquad \text{Eqn. 12}$$

A more general optimization algorithm presented in Appendix D, however, removes these assumptions and deals with an arbitrary wind profile based on wind models discussed immediately below.

Figure 11:
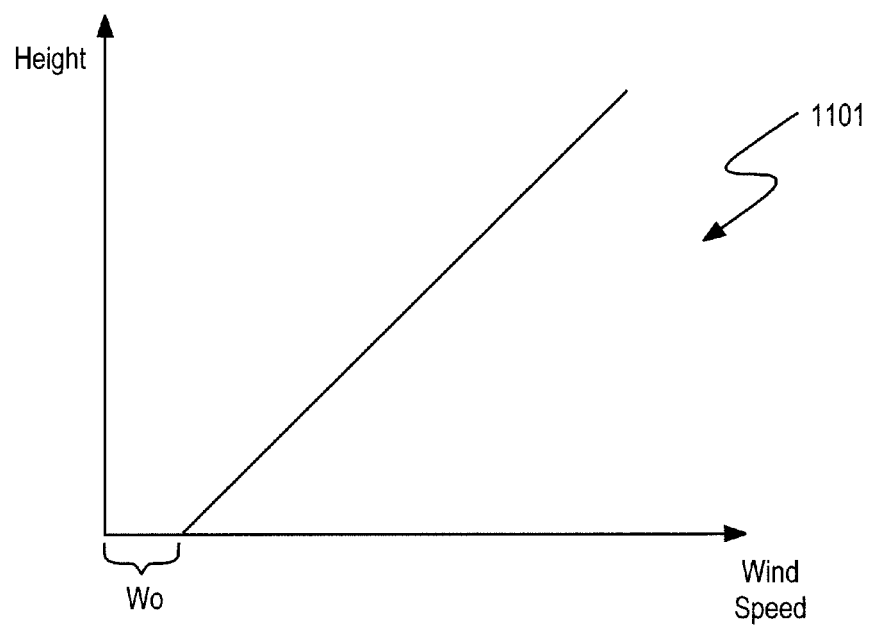
FIG. 11 shows a linear wind model and a logarithmic and linear wind model.
Figure 11:
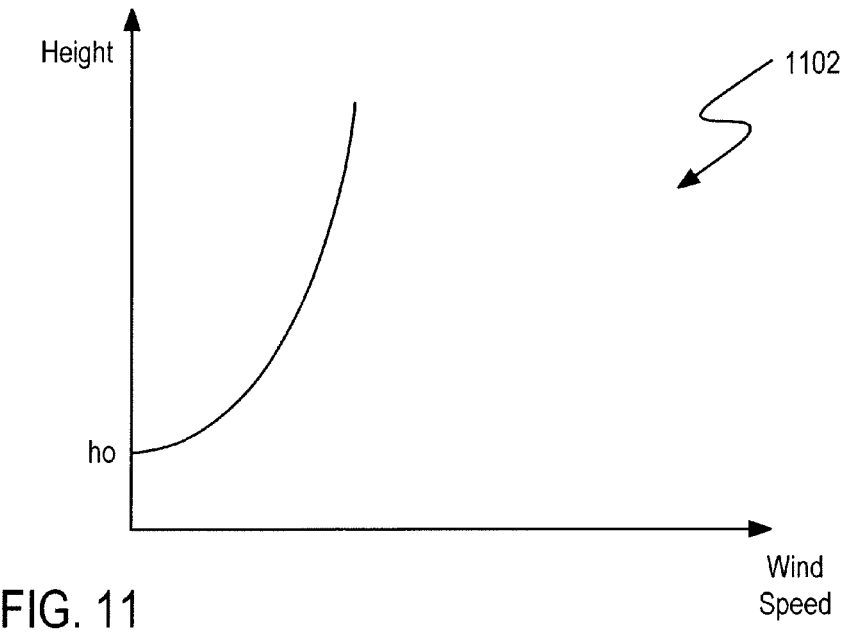

Three possible improvements resulting in better assumptions about the wind's behavior from the current altitude all the way down to the ground can be made. A first improvement is based on the assumption that we have multiple parafoils deployed one after another to the same area. Then, a wind profile can be measured by the first system and transmitted to all following systems. A second improvement can be made if we have a ground station that constantly measures ground winds (in the x-direction) and transmits them to all descending parafoils (or a single parafoil) using an RF link or wireless network as described in Section 5. In this case rather than assuming a constant wind, we can model the wind as varying linearly with altitude as shown in FIG. 11 (improvement 1101). Finally, a third improvement 1102 can be used if no information about the ground winds is available at all. In this case, rather than using a constant wind speed profile, we will model wind magnitude as varying logarithmically with altitude. In any case a new wind profile will be used: i) during the downwind leg to constantly update $D_{switch}$, i.e. an altitude to start the final turn maneuver (Eqn. 7); ii) determine the final approach point given by Eqn. 8; iii) determine the turn time $T_{turn}$ of Eqn. 5; and iv) determine the turn rate profile during the final turn to be at the final approach point at the prescribed time.

In the case of the first improvement a three-dimensional altitude-dependent wind profile can be available $$W(h) = \{W_x(h), W_y(h), W_z(h)\} \qquad \text{Eqn. 13}$$

Here h is the altitude above the ground while $W_x$, $W_y$ and $W_z$ are the x-, y- and z-components of the wind. Depending on how this profile was measured it may lack some of the components, i.e. $W_z$ component. Generally speaking, to compute $D_{switch}$, final approach point and final turn rate profile only x component is needed. Therefore, the only change in Eqns. 7 and 8 will be to substitute the constant wind W with the x-component of so-called ballistic wind $W_B$, which basically represents the average of winds from a specific altitude all way down to the ground, as explained in Appendix E.

Figure 12:
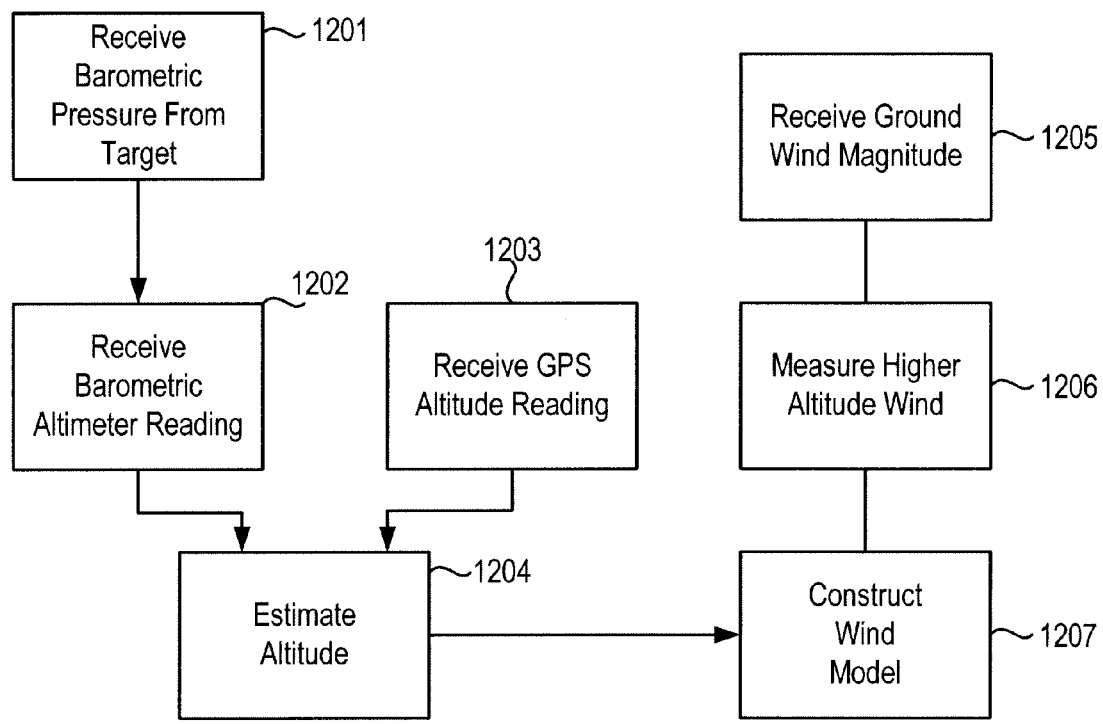
FIG. 12 shows an embodiment of a methodology executed by a trajectory planning unit to calculated a wind model.

In the case of the second (linear) wind model improvement 1101, upon exiting the loitering phase the wind profile below the current altitude will be estimated as $$W(h) = W_0 + (m_w)h \qquad \text{Eqn. 14}$$

where $W_0$ is the ground wind as measured at/near the ground (h=0) in the vicinity of the target and $m_w$ is the rate at which the wind magnitude varies with altitude. In an embodiment, as observed in FIG. 12, the ground wind term $W_0$ is provided 1205 to the parafoil (e.g., by being manually or electronically communicated to the parafoil before it is dropped, or, in mid-flight after it is dropped such as during the loitering phase). The parafoil's control unit also measures (updates) the wind magnitude 1206 at any altitude $W_{h\_high}$ as described above. In order to determine the current altitude, the parafoil's control unit receives a barometric pressure reading from the target 1201 and receives a reading from its own on board barometric altimeter 1202. With these readings and an altitude reading from the on board GPS system 1203, the control unit estimates its altitude 1204. During the downwind leg (if the ground station is available) the value of $W_0$ may be constantly updated as well as an estimate of $W_{h\_high}$. The parafoil's control unit then calculates 1207 $m_W = (W_{h\_high} - W_0)/(h\_high)$ where h_high is the altitude at which the wind was measured to be $W_{h\_high}$. Once again, the ballistic wind value $W_B$ (Appendix E) will be used in lieu of W in Eqns. 8 and 9. Other than these modifications, the flight path of the parafoil may be controlled as described in Section 2.0.

In the case of the third (logarithmic) wind model improvement 1102, starting from the downwind leg the wind is modeled as $$W(h) = (m_W)\ln(h/h_0), \text{ when } h \geq h_0 (W(h)=0, \text{ when } 0<h<h_0) \qquad \text{Eqn. 15}$$

Here, $m_W$ is a coefficient that is defined by the onboard control unit based on the current wind measurements taken at several consequent altitudes using standard regression analysis. Parameter $h_0$, a small number below 1 meter, is called the "aerodynamic roughness length" and defines the type of terrain around the landing zone and is set before flight. This model needs no prior knowledge of the ground winds. The value of $m_W$ is constantly updated during the downwind leg to come up with more accurate estimates of $D_{switch}$ and the final approach point. Again, the ballistic wind value $W_B$ (Appendix E) is used in lieu of W in Eqns. 8 and 9. Other than these modifications, the flight path of the parafoil may be controlled as described in Section 2.0. Derivations of the coefficient $m_W$ in Eqn. 15 along with analytical dependences for Eqn. 8 (which may be used even without computing the ballistic wind) is provided in Appendix F.

4.0 Moving Target

The discussions above have been directed to an environment where the target is assumed to be a fixed location on the ground. Other applications are envisioned where it may be desirable to land the parafoil on a moving target such as a ship at sea. FIGS. 13a and 13b pertain to an embodiment where the target is moving in the −x direction (against the wind) and the parafoil is dropped upwind of the moving target at point DP. The target can therefore be stated in two ways which are equated. The first way to define the target is by the difference in its position along the x axis from the moment the parafoil leaves the loitering phase to the moment the parafoil lands.

This value can be expressed as $x_T - V_T(A\_switch)/V_V$ where $V_T$ is the velocity of the target and $A\_switch/V_V$ is the amount of time expended from the moment the loitering phase is ended to the moment the parafoil lands. Another way to define the target is simply from its earlier definition L as the distance from the parafoil to the target along the x axis. Equating the two expressions, which essentially states that the upon the parafoil exiting the loitering phase the parafoil must move a net distance L along the x axis to land on a moving target that will be at position $x_T - V_T(A\_switch)/V_V$ from its location $x_T$ when the loitering phase was exited yields:

$$L = x_T - \frac{V_T}{V_V} A_{switch} \qquad \text{Eqn. 16}$$

The above Eqn for L can be substituted into Eqn. 6 above and solved for A_switch as $$A_{switch} = V_v \frac{x_T + V_h(T_{turn} + 2T_{app}^{des})}{W - V_h + V_T} \qquad \text{Eqn. 17}$$

which expresses the altitude that the parafoil can exit its loitering phase at its location along the x axis within the loitering phase. With the new value of A_switch, the operation of the parafoil may be controlled as described above in Section 2.0. Introduction of improved wind models such as those discussed above with respect to Section 3.0 will yield further changes to the A_switch calculation.

Figure 14A:
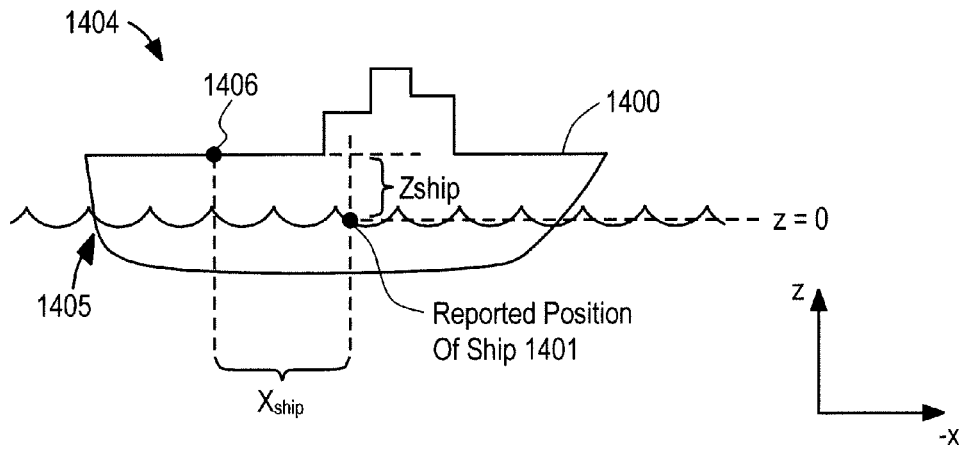
FIGS. 14a and 14b pertain to a trajectory planning unit that utilizes the model of a vehicle.

Another enhancement that may be necessary to accurately land a parafoil on a moving target is the specific location of the landing area on the target itself. For example, referring to FIG. 14a, if the target is a moving ship 1400 and its reported position is presumed to be some location 1401 in the middle of the ship at sea level, some pre-processing may be necessary to more accurately define the actual landing area on the ship. In the example of FIG. 14a, the appropriate landing area for the parafoil is a rear deck 1404 that is above sea level at the ship's stern 1405. As such, the "true" landing area target 1406 needs to be offset from the position of the ship 1401 as it is reported to the parafoil's guidance system. Moreover, different ships may have different landing areas as a function of the ship's design. For example, a first type of ship may have its appropriate landing on a read deck as observed in FIG. 14a whereas other ships may have its appropriate landing area on a forward deck (toward the bow of the ship) or on a deck in the middle of the ship but more toward the port or starboard sides.

A possible benefit of the guidance algorithm described in Section 2.0 is that it establishes the reference trajectory in the inertial reference frame. In the case of the moving target (ship, submarine, etc.) this trajectory is tied to the moving target. Therefore, while planning the trajectory it is possible to construct the trajectory so that the parafoil avoids, e.g., a superstructure on the ship's deck. No other known guidance algorithm has this feature.

Figure 14B:
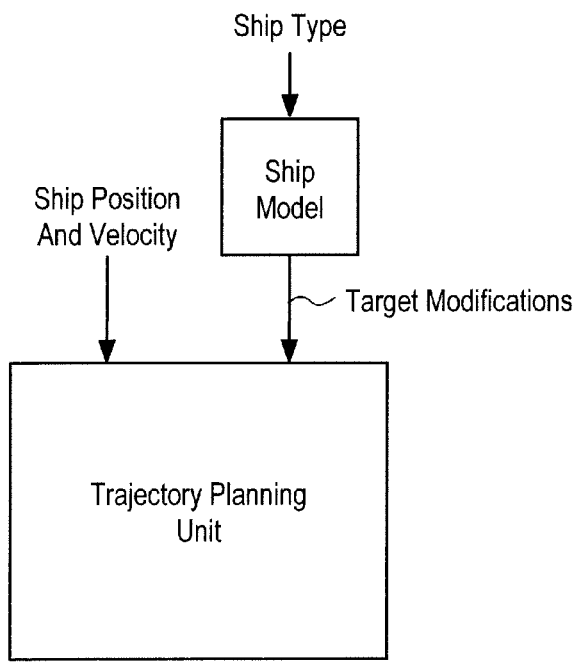

In an embodiment, as shown in FIG. 14b, the parafoil's control unit includes a data store that models the different kinds of ships that the parafoil may be asked to land on, where, each ship's model effects the necessary modification to the actual target based on the type of ship and also affects the calculations accordingly. In operation, a ship's position, velocity and type are entered or communicated to the parafoil (e.g., before or after it is dropped). The parafoil's trajectory planning unit not only uses the ship's position and velocity to calculate the target but also modifies the equations appropriately in view of the ships' type to more accurately define the target in a manner that is customized to the particular ship.

In the case of FIG. 14a, for example, the fact that the rear deck is raised means that the parafoil will have to exit the loitering phase sooner to keep the guidance calculations consistent. As such, Eqn. 17 would be modified by the trajectory planning unit to be A_switch=[ . . . ]+$z_{ship\_x}$ where $z_{ship\_x}$ corresponds to the vertical offset between the precise location where the ship's recognized position $x_T$ at loiter exit is and the height of the rear deck relative to that position. Similarly, Eqn. 16 would be modified by the trajectory planning unit as $L=(x_T-x_{ship})-V_T((A\_switch)/V_V)$ to adjust for the fact that the rear deck is behind the ship's recognized position. Lateral changes along the y axis could either affect the loitering position of the parafoil or the radius of the turn R.

The guidance algorithm features the optimized final turn which allows adjusting the actual landing time. In this case the heave motion of the ship can also be taken into account. This motion can be estimated by the parafoil's control unit based on the altitude above the sea data at the intended touchdown point. Such data can be uplinked to the parafoil using the ground weather station or a GPS unit using network connectivity as described in Section 5.

5.0 Applications of Wireless Network Connectivity to Parafoil Control Unit

Recall from the discussion of FIG. 3a that the control unit may include various wireless interface circuitry; such as first wireless network interface circuitry 317 that is capable of communicating (including transmission and/or reception) over a local carrier's network and/or second wireless network interface circuitry 320 that is capable of communicating over a proprietary network. In various embodiments, the wireless interface circuitry 317, 320 is used to communicate pertinent information to the parafoil's control unit after the parafoil has been dropped from the airborne vehicle. Examples include, for instance, uploading the ground wind magnitude or the entire winds profile versus altitude along with the ground barometric pressure (to build a wind model as described in Section 3.0), uploading constantly changing target position (such as in the case of a moving ship), including its vertical elevation (to account for a ship's heave motion as described in Section 4.0), a change in a new stationary target location or the new desired landing direction, not necessarily aligned with the ground-winds.

Figure 15:
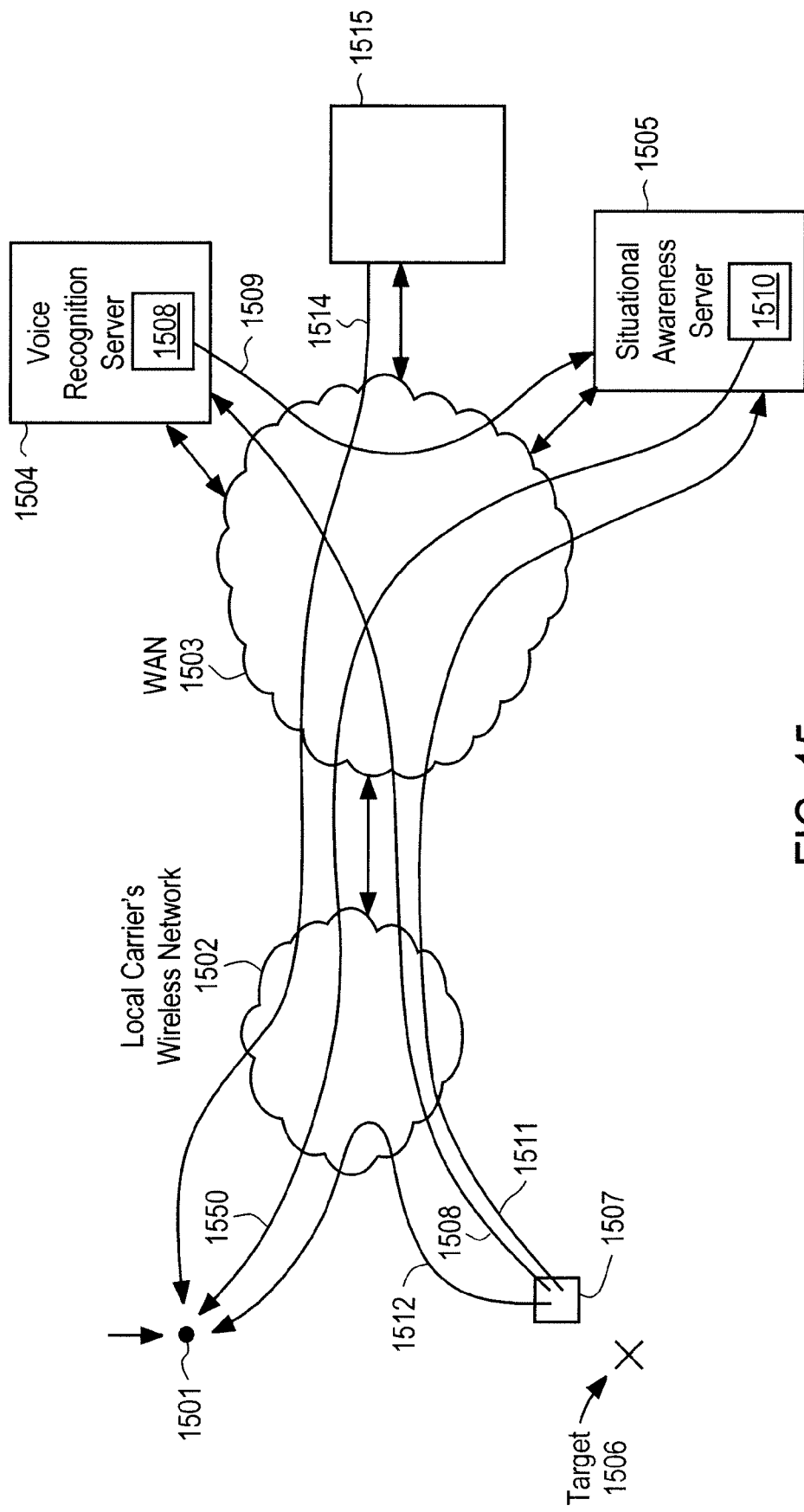
FIG. 15 shows an embodiment of a networked IS that involves a descending parafoil.

FIG. 15 shows an exemplary information systems (IS) infrastructure for transferring such information to the parafoil. As observed in FIG. 15 an airborne parafoil 1501 is within range of a local carrier's wireless network 1502 such as a tactical cellular GSM network. The local carrier's wireless network 1502 includes a gateway to a wide area network (WAN) 1503 such as the Internet. A voice recognition server 1504 and a situational awareness (SA) server 1505 are each coupled to the WAN 1503 (notably the recognition server 1504 and situational awareness server 1505 may be integrated into a single endpoint).

According to one embodiment, a command to be given to the airborne parafoil 1501 is verbally spoken, for instance, by an individual on the ground in the vicinity of the parafoil's target 1506 into a handheld and/or portable device 1507 such as a cell phone or smartphone. The verbal command may be any of (but not necessarily limited to) a command to change the target and/or a command to update the ground wind information (e.g., a command to enter a ground wind profile, a command to enter a change in ground wind magnitude and/or ground wind direction, or, a command to change the target to a new location). The verbal command is communicated via a network connection 1508 between the device 1507 and the voice recognition server 1504.

The voice recognition server 1504 (e.g., by way of voice recognition software and/or hardware) processes the verbal command and converts the verbal command information into a digital format that is understandable to a computing system. For example if the verbal command was to update the ground wind speed and/or direction, the voice recognition server might create an XML based message or other body of information 1508 in some kind of syntax that is understandable to a computing system. The information 1508 is then sent by way of a network connection 1509 from the voice recognition server 1504 to the situational awareness server 1505. The situational awareness server 1505 then translates the digitally formatted command 1508 into a packet 1510 that is sent 1550 to the airborne parafoil 1501 over the local carrier's wireless network 1502.

In an alternate embodiment, rather than a verbal command being spoken into the device 1507, the command is instead entered by way of a keyboard or other user interface of the portable device 1507 and sent 1511 by way of a packet to the situational awareness server 1505 or the parafoil directly 1512. In the former case 1511 where the packet is sent to the situation awareness server first, the situational server sends a packet 1510 having the entered command to the airborne parafoil. In an embodiment, the portable device 1507 may be specialized equipment. For example, the portable device 1507 may be a portable weather station or wind measurement equipment (such as the kind made by Kestrel, Inc. of Sylvan Lake, Mich.) having its own wireless network interface (and/or integrated cell phone and/or smartphone circuitry). In this case, with the same portable device 1507, wind information can be measured, packetized and sent 1511 to either the situational awareness server 1505 (for subsequent delivery to the airborne parafoil 1501) or to the airborne parafoil directly 1512.

In even further alternate embodiments, a verbal or entered command is made from a command center or other computing system 1551 that is remote from the parafoil's drop zone. For instance, a command 1514 to change the parafoil's target may be made, while the parafoil is in flight, from a computing system 1515 that is coupled to the WAN 1503 many miles away from the parafoil's drop zone. The WAN may be commercial, proprietary, public or some combination thereof and may even have global reach capability. The command may be sent to the parafoil directly 1514, or, to a situational awareness server beforehand.

The parafoil may further be configured to transmit into the wireless network 1502 any/all of its measurement information, such as the wind's magnitude at higher altitudes, its ground speed measurements and/or its positional measurements for analysis and/or observation at some endpoint. For instance, according to one embodiment, a plurality of parafoil's are dropped simultaneously over a common area, and, as the parafoils descend (e.g., in a loitering phase), they transmit their locations (and/or ABCD loitering parameters) to a remote command center 1515 that tracks all of the parafoils in flight in real time. An individual or application software then decides, while the parafoils are descending, what their respective targets are. Respective packets are then sent to each of the airborne parafoils informing them of their specific target.

In another application of a parafoil's ability to transmit measured information into a wireless network, according to one approach a first parafoil is dropped prior to one or more subsequent parafoils. The purpose of the first parafoil is to make wind measurements during its descent and send the measurement results (and/or a wind profile) "up" to the second set of one or more subsequently dropped parafoils. Here, the parafoil can transmit the wind information in the form of one or more packets into the local carrier's network 1502 which redirects (or multicasts or broadcasts) the packet(s) back to each subsequent parafoil. Alternatively, a private wireless link or network can be established between the descending parafoils and the wind information transmitted up to them through the proprietary wireless link.

To further that point although much of the previous examples discussed the transmission of wireless information to/from an airborne parafoil through a local carrier's wireless network, the same core schemes may be implemented with a proprietary wireless network or link. For example, the portable device 1507 in the vicinity of the target may transmit ground wind information up to a descending parafoil through a proprietary wireless link that is established between the device 1507 and the descending parafoil. Likewise, any packets that are sent to an airborne parafoil may traverse only a proprietary network without any public traffic (up to an including the wireless network) or some combination of proprietary and public traffic networks may be utilized.

For any of the embodiments discussed above, note that a parafoil may wirelessly transmit its location, altitude and/or high altitude wind information into the network and ultimately to a computing system which executes the trajectory planning unit algorithms (e.g., with other accumulated information such as ground winds, velocity of moving target, etc.). The computing system then sends an updated trajectory plan through the network and wirelessly to the descending parafoil which implements the newly received trajectory plan.

Figure 16:
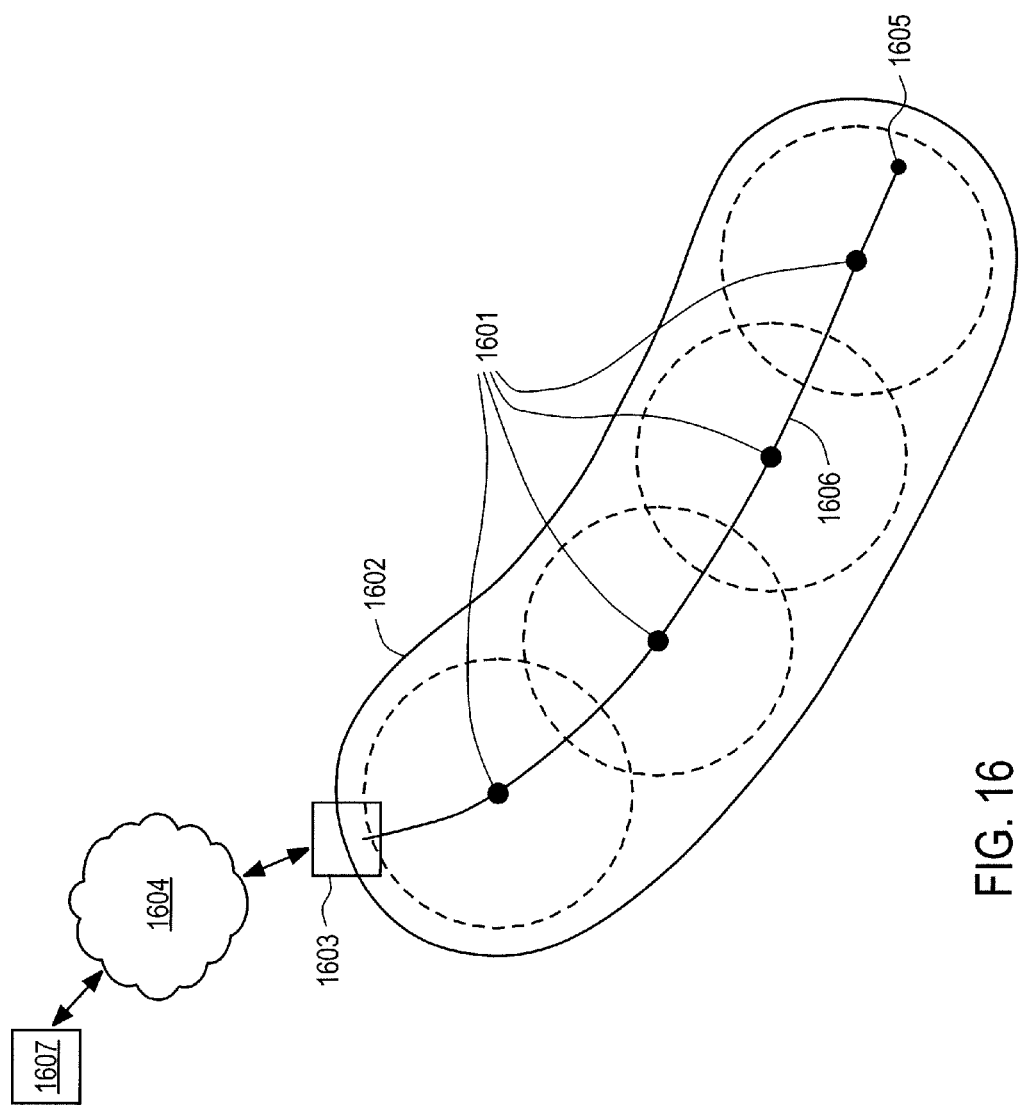
FIG. 16 shows a wireless network established by parafoils.

FIG. 16 shows another approach in which a group of parafoils 1601 are simultaneously descending to establish a temporary wireless network 1602, for example, between the access point 1603 of an established network 1604 and another remote location 1605 which has no connection to the established network 1604. For example, if a group of workers or soldiers are at a remote location 1605 (e.g., separated by a mountain range) and a need arises to communicate to them over the established network 1604, the parafoils 1601 are dropped to descend (e.g., in a permanent loitering phase)

along an imaginary line 1606 that connects the access point 1603 to the remote location 1605.

Apart from wireless network interface circuitry, each of the parafoils 1601 further includes wireless network routing and/or switching software/hardware to route packets. As such, an airborne wireless network is created with each of the parafoils acting as a node of the network. A packet sent from the access point 1603 to the remote location 1605 is relayed by way of nodal hops from parafoil to parafoil until it reaches the remote location 1605. Likewise, a packet sent from the remote location 1605 is relayed by way of nodal hops from parafoil to parafoil in the reverse direction until it reaches the access point 1603. The parafoils 1601 may include nearest neighbor or other awareness technology that permit them to periodically update configure (e.g., by way of periodic updates) their routing tables mid-flight (e.g., forming a so-called mesh network), or, the nodal configuration and routing tables may be predetermined ahead of time. The drop pattern and/or guidance systems may be used to orient each of the parafoils in its proper nodal position.

Whether the individuals at the remote location 1605 are aware of the establishment of the temporary network in their direction may depend on the circumstances. For instance, if a verbal communication needs to take place between individuals at some command center 1607 coupled to the established network 1604 and the individuals at the remote location 1605, the parafoils 1601 may be equipped with transmission circuitry that transmits a signal to equipment held by the personnel at the remote location 1605 that triggers some kind of alarm that an imminent verbal communication is being arranged. By contrast, if only an electronic message is to be delivered to the remote personnel, such as an email, no alarm need be triggered ahead of time.

The above discussion spoke of the network established by the parafoils as being temporary in the sense that the network is torn down or otherwise made unworkable prior to or approximately at the time of the landing of the parafoils. A temporary network is useful where, for instance, the safety or security of the remote team 1605 is comprised by the presence of the network. For example, continued transmissions by the parafoil/nodes might lead to the unwanted discovery of the network and the remote individuals. Other circumstances may arise where a permanent network is desired. In this case, the parafoil/nodes can continue to operate to implement a wireless network long after the parafoils have landed.

Lastly, that FIG. 16 is simplistic in that only a single line 1606 is drawn to connect to a single access node 1603 to a single remote location 1605. In actuality the "line" may take any shape suitable to connect an access point to a remote location (e.g., curved, triangular, etc.). Moreover, the parafoil implemented network may reach more than one access point and/or more than one remote location by arranging multiple lines/branches as appropriate. Conceivably, a central core of parafoils may form a short-term network backbone and branches of parafoils extended along lines stemming from the backbone/core may reach out to various established network access points and/or remote locations.

Figure 17:
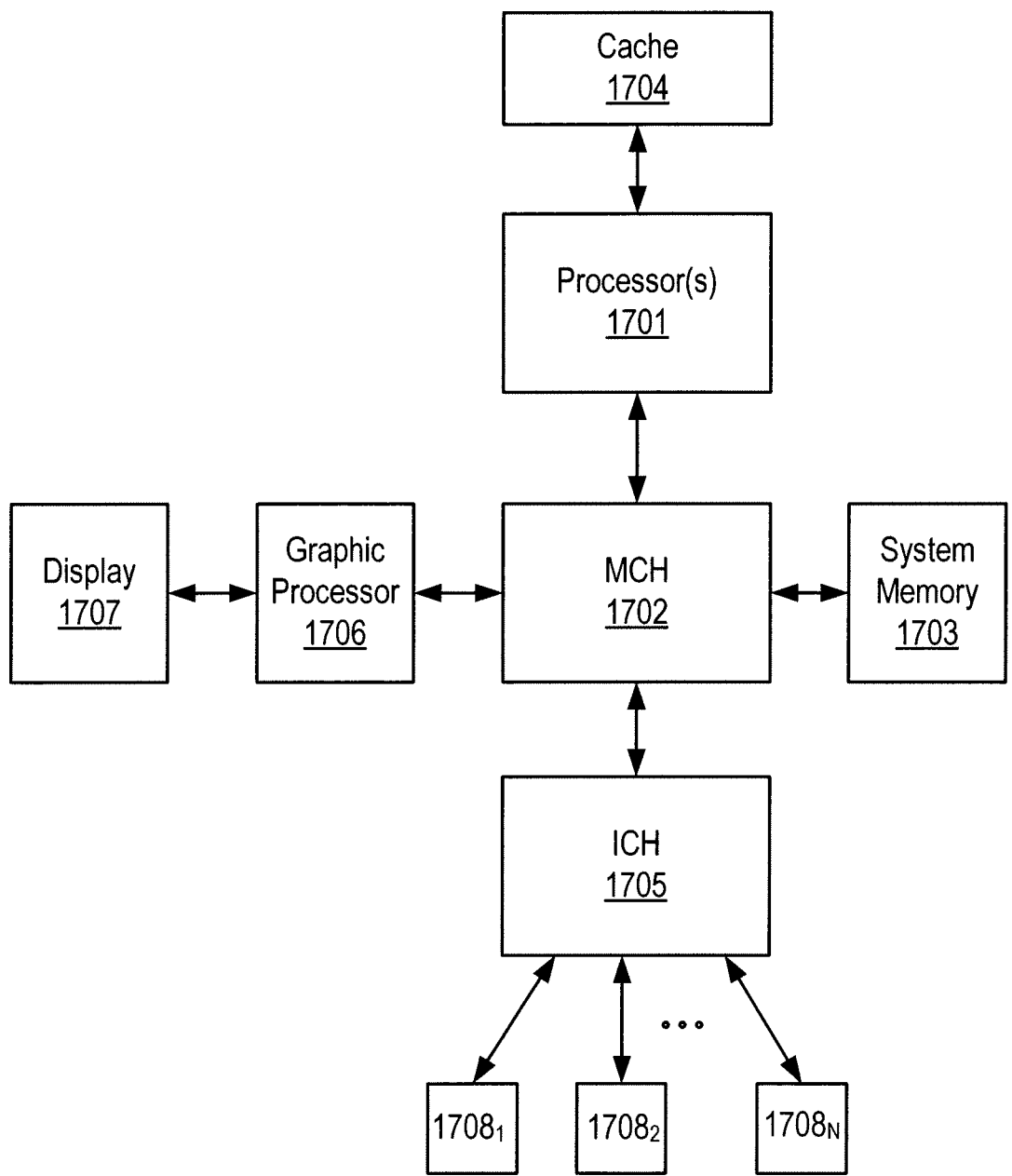
FIG. 17 shows a computing system.

FIG. 17 shows an embodiment of a computing system (e.g., a computer). The exemplary computing system of FIG. 17 includes: 1) one or more processing cores 1701 that may be designed to include two and three register scalar integer and vector instruction execution; 2) a memory control hub (MCH) 1702; 3) a system memory 1703 (of which different types exist such as DDR RAM, EDO RAM, etc.); 4) a cache 1704; 5) an I/O control hub (ICH) 1705; 6) a graphics processor 1706; 7) a display/screen 1707 (of which different types exist such as Cathode Ray Tube (CRT), flat panel, Thin Film Transistor (TFT), Liquid Crystal Display (LCD), DPL, etc.) one or more I/O devices 1708.

The one or more processing cores 1701 execute instructions in order to perform whatever software routines the computing system implements. The instructions frequently involve some sort of operation performed upon data. Both data and instructions are stored in system memory 1703 and cache 1704. Cache 1704 is typically designed to have shorter latency times than system memory 1703. For example, cache 1704 might be integrated onto the same silicon chip(s) as the processor(s) and/or constructed with faster SRAM cells whilst system memory 1703 might be constructed with slower DRAM cells. By tending to store more frequently used instructions and data in the cache 1704 as opposed to the system memory 1703, the overall performance efficiency of the computing system improves.

System memory 1703 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1703 prior to their being operated upon by the one or more processor(s) 1701 in the implementation of a software program. Similarly, data that a software program determines should be sent from the computing system to an outside entity through one of the computing system interfaces, or stored into an internal storage element, is often temporarily queued in system memory 1703 prior to its being transmitted or stored.

The ICH 1705 is responsible for ensuring that such data is properly passed between the system memory 1703 and its appropriate corresponding computing system interface (and internal storage device if the computing system is so designed). The MCH 1702 is responsible for managing the various contending requests for system memory 1703 access amongst the processor(s) 1701, interfaces and internal storage elements that may proximately arise in time with respect to one another.

One or more I/O devices 1708 are also implemented in a typical computing system. I/O devices generally are responsible for transferring data to and/or from the computing system (e.g., a networking adapter); or, for large scale non-volatile storage within the computing system (e.g., hard disk drive or semiconductor non-volatile storage device that is the main store for the system's program code when the system is powered off). ICH 1705 has bi-directional point-to-point links between itself and the observed I/O devices 1708.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.) or may be compiled directly into object code.

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Appendix A

Model Predictive Control

Consider a simple Single-Input Single-Output (SISO) discrete system described in state space form as:

$$x_{k+1} = Ax_k + Bu_k \\ y_k = Cx_k \quad (1)$$

(Hereinafter bold font for lower-case symbols denotes vectors and bold font for upper-case symbols denotes matrices). Assume that the system matrices A, B, and C are known and that $x_k$ is the state vector, $u_k$ is the control input, and $y_k$ is the output at time $k$. The model described above can be used to estimate the future state of the system. Assuming a desired trajectory $w_k$ is known an estimated error signal $\hat{e}_k = w_k - \hat{y}_k$ is computed over a finite set of future time instants called the prediction horizon, $H_p$ (hereinafter the symbol "^" is used to represent an estimated quantity). In model predictive control, the control computation problem is cast as a finite time discrete optimal control problem. To compute the control input at a given time instant, a quadratic cost function is minimized through the selection of the control history over the control horizon. The cost function can be written as:

$$J = (W - \hat{Y})^T Q(W - \hat{Y}) + U^T RU, \quad (2)$$

where $$W = [w_{k+1}, w_{k+2}, \ldots, w_{k+H_p}]^T, \quad (3)$$

$$\hat{Y} = K_{CA} x_k + K_{CAB} U, \quad (4)$$

$$U = [u_k, u_{k+1}, \ldots, u_{k+H_p-1}]^T, \quad (2)$$

and both R and Q are symmetric positive semi-definite matrices of size $H_p \times H_p$. Equation 1 is used to express the predicted output vector $\hat{Y}$ in terms of the system matrices $$K_{CA} = \begin{bmatrix} CA \\ CA^2 \\ \vdots \\ CA^{H_p} \end{bmatrix}, \quad (6)$$

$$\mathbf{K}_{CAB} = \begin{bmatrix} \mathbf{CB} & 0 & 0 & 0 & 0 \\ \mathbf{CAB} & \mathbf{CB} & 0 & 0 & 0 \\ \mathbf{CA}^2\mathbf{B} & \mathbf{CAB} & \mathbf{CB} & 0 & 0 \\ \vdots & \vdots & \vdots & \ddots & 0 \\ \mathbf{CA}^{H_p-1}\mathbf{B} & \cdots & \mathbf{CA}^2\mathbf{B} & \mathbf{CAB} & \mathbf{CB} \end{bmatrix}. \tag{7}$$

The first term in Eq.(2) penalizes tracking error, while the second term penalizes control action. Equations (2), (6), and (7) can be combined resulting in the cost function $$J = (\mathbf{W} - \mathbf{K}_{CA}\mathbf{x}_k - \mathbf{K}_{CAB}\mathbf{U})^T \mathbf{Q}(\mathbf{W} - \mathbf{K}_{CA}\mathbf{x}_k - \mathbf{K}_{CAB}\mathbf{U}) + \mathbf{U}^T \mathbf{R} \mathbf{U} \tag{8}$$

that is now expressed in terms of the system state $x_k$, desired trajectory W, control vector U and system matrices A, B, C, Q, and R.

The control U, which minimizes Eq.(8), can be found analytically as $$\mathbf{U} = \mathbf{K}(\mathbf{W} - \mathbf{K}_{CA}\mathbf{x}_k), \tag{9}$$

where $$\mathbf{K} = \left(\mathbf{K}_{CAB}^T \mathbf{Q} \mathbf{K}_{CAB} + \mathbf{R}\right)^{-1} \mathbf{K}_{CAB}^T \mathbf{Q}. \tag{10}$$

Equation 10 contains the optimal control inputs over the entire control horizon, however at time $k$ only the first element $u_k$ is needed. The first element $u_k$ can be extracted from Eq.(9) by defining $\mathbf{K}_1$ as the first row of K. The optimal control over the next time sample becomes $$u_k = \mathbf{K}_1(\mathbf{W} - \mathbf{K}_{CA}\mathbf{x}_k), \tag{11}$$

where calculation of the first element of the optimal control sequence requires the desired trajectory W over the prediction horizon and the current state $x_k$.

Parafoil Modeling

The full combined flexible system of the parafoil canopy and the payload can be represented as a 9 or 8 degree-of-freedom (DoF) model depending on the specific harness connecting these two pieces together. Alternatively it can also be modeled as a solid structure requiring only six-DoF, which include three inertial position components of the system mass center as well as the three Euler orientation angles of the parafoil-payload system. This section first introduces a six-DoF model of a generic parafoil system that will be used for simulation and GNC algorithm development, and then addresses a simplified model used to compute the MPC gains appearing in Eq.(11).

A. Six DoF Model

Figure A shows a schematic of a parafoil and payload system. With the exception of movable parafoil brakes, the parafoil canopy is considered to be a fixed shape once it has completely inflated. A body frame (B) is fixed at the system mass center with the unit vectors $i_B$ and $k_B$ orientated forward and down. Orientation of the parafoil canopy with respect to the body frame is defined as the incidence angle $\Gamma$.

Orientation of the body frame {B} is obtained by a sequence of three body-fixed rotations. Starting from the inertial frame {I}, the system is successively rotated through Euler yaw $\psi$, pitch $\vartheta$, and roll $\varphi$. The resulting transformation from the inertial to body frame is $$T_{IB} = \begin{bmatrix} c_\theta c_\psi & c_\theta s_\psi & -s_\theta \\ s_\phi s_\theta c_\psi - c_\phi s_\psi & s_\phi s_\theta s_\psi + c_\phi c_\psi & s_\phi c_\theta \\ c_\phi s_\theta c_\psi + s_\phi s_\psi & c_\phi s_\theta s_\psi - s_\phi c_\psi & c_\phi c_\theta \end{bmatrix}, \qquad (12)$$

where the common shorthand notation for trigonometric functions is employed, so that for any angle $\alpha$ $\sin(\alpha) \equiv s_\alpha$ and $\cos(\alpha) \equiv c_\alpha$. Translation kinematics of the system become $$\begin{bmatrix} \dot{x} \\ \dot{y} \\ \dot{z} \end{bmatrix} = T_{IB}^T \begin{bmatrix} u \\ v \\ w \end{bmatrix}, \qquad (13)$$

where $x$, $y$, and $z$ are the inertial positions and $u$, $v$, and $w$ are body frame velocities. Defining the angular velocity of the parafoil payload system as:

$$\omega_{B/I} = p\mathbf{i}_B + q\mathbf{j}_B + r\mathbf{k}_B \qquad (14)$$

results in the following rotational kinematics equations:

$$\begin{bmatrix} \dot{\phi} \\ \dot{\theta} \\ \dot{\psi} \end{bmatrix} = \begin{bmatrix} 1 & s_\phi t_\theta & c_\phi t_\theta \\ 0 & c_\phi & -s_\phi \\ 0 & s_\phi c_\theta^{-1} & c_\phi c_\theta^{-1} \end{bmatrix} \begin{bmatrix} p \\ q \\ r \end{bmatrix} \qquad (15)$$

($t_\alpha \equiv \tan(\alpha)$).

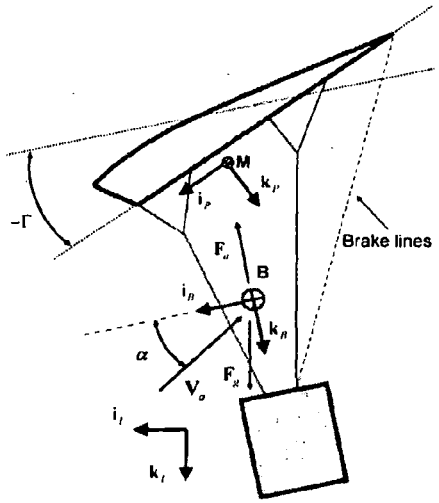

Fig. A  A generic 6-DoF parafoil-payload system.

Forces and moments acting on the parafoil and payload have contributions from: weight, aerodynamic loads, and apparent mass of the canopy. Weight contribution of the system is expressed in the body frame, $$F_R = \begin{bmatrix} -s_\theta \\ s_\phi c_\theta \\ c_\phi c_\theta \end{bmatrix} mg, \qquad (16)$$

with $m$ being the system mass and $g$ the acceleration from gravity. Aerodynamic forces and moments have contributions from both the canopy and payload. Both canopy and payload contributions are combined into a single aerodynamic model using standard aerodynamic derivatives. The aerodynamic force is modeled as:

$$\mathbf{F}_a = \mathbf{T}_{AB} \frac{\rho V_a^2 S_p}{2} \begin{bmatrix} C_{D0} + C_{D\alpha 2}\alpha^2 \\ C_{Y\beta}\beta \\ C_{L0} + C_{L\alpha}\alpha \end{bmatrix}, \quad (17)$$

where; $\alpha$ and $\beta$ are the angle of attack and sideslip of the body frame, $V_a$ is the true airspeed, $S_p$ is the parafoil canopy area, and $\mathbf{T}_{AB}$ is the transformation from the aerodynamic to body frame by the angle of attack $\alpha$. Similarly, the aerodynamic moment is written as:

$$\mathbf{M}_a = \frac{\rho V_a^2 S_p}{2} \begin{bmatrix} b(C_{l\beta} + \frac{b}{2V_a}C_{lp}) + \frac{b}{2V_a}C_{lr}r + \bar{d}^{-1}C_{l\delta a}\delta_a) \\ \bar{c}(C_{m0} + C_{m\alpha}\alpha + \frac{\bar{c}}{2V_a}C_{mq}q) \\ b(C_{n\beta} + \frac{b}{2V_a}C_{np}p + \frac{b}{2V_a}C_{nr}r + \bar{d}^{-1}C_{n\delta a}\delta_a) \end{bmatrix} \quad (18)$$

where, $b$ and $\bar{c}$ are the canopy span and chord, $\delta_a$ is the asymmetric brake deflection, and $\bar{d}$ is the maximum brake deflection. Parafoil canopies with small mass to volume ratios can experience large forces and moments from accelerating fluid called "apparent mass." They appear as additional mass and inertia values in the final equations of motion. Parafoil canopies with small arch-to-span ratios and negligible camber can be approximated to useful accuracy by an ellipsoid having three planes of symmetry; however, the planes of symmetry in the canopy frame may not be aligned with the body frame, as shown in Fig. A. Apparent mass forces and moments for an approximately ellipsoidal canopy can be conveniently defined using the translation and angular velocities expressed in the canopy frame $\{P\}$. Defining $\mathbf{T}_{BP}$ as the single axis transformation from the body to canopy reference frame by the incidence angle $\Gamma$, $r_{BM} = [x_{BM}, y_{BM}, z_{BM}]^T$ as the vector from the system mass center to the apparent mass center, and $\mathbf{W}$ as the wind vector, the velocity of the canopy at the apparent mass center can be expressed in the canopy frame as:

$$\begin{bmatrix} \tilde{u} \\ \tilde{v} \\ \tilde{w} \end{bmatrix} = \mathbf{T}_{BP}\left(\begin{bmatrix} u \\ v \\ w \end{bmatrix} + \mathbf{S}_\omega^B \begin{bmatrix} x_{BM} \\ y_{BM} \\ z_{BM} \end{bmatrix} - \mathbf{T}_{IB}\mathbf{W}\right), \quad (19)$$

where the second term represents the vector cross product using the skew-symmetric matrix $\mathbf{S}_\omega^B$, constructed as follows:

$$\mathbf{S}_\xi^A = \begin{bmatrix} 0 & -\xi_z & \xi_y \\ \xi_z & 0 & -\xi_x \\ -\xi_y & \xi_x & 0 \end{bmatrix} \quad (20)$$

(here $\xi_x$, $\xi_y$ and $\xi_z$ are the components of vector $\xi$ expressed in a coordinate frame $\{A\}$).

Similarly, the angular velocity expressed in the canopy frame $\{P\}$ becomes $$\begin{bmatrix} \tilde{p} \\ \tilde{q} \\ \tilde{r} \end{bmatrix} = \mathbf{T}_{BP}\begin{bmatrix} p \\ q \\ r \end{bmatrix}. \quad (21)$$

Forces and moments from apparent mass and inertia are then found by relating the fluid's kinetic energy to resultant forces and moments. Apparent mass and inertia contributions expressed in the body frame can be written as:

$$\mathbf{F}_{a.m.} = -\mathbf{T}_{BP}^T\left(\mathbf{I}_{a.m.}\begin{bmatrix} \dot{\tilde{u}} \\ \dot{\tilde{v}} \\ \dot{\tilde{w}} \end{bmatrix} + \mathbf{S}_\omega^P \mathbf{I}_{a.m.}\begin{bmatrix} \tilde{u} \\ \tilde{v} \\ \tilde{w} \end{bmatrix}\right), \quad (22)$$

$$\mathbf{M}_{a.i.} = -\mathbf{T}_{BP}^{T}\left(\mathbf{I}_{a.i.}\begin{bmatrix}\dot{\tilde{p}}\\ \dot{\tilde{q}}\\ \dot{\tilde{r}}\end{bmatrix} + \mathbf{S}_{\omega}^{P}\mathbf{I}_{a.i.}\begin{bmatrix}\tilde{p}\\ \tilde{q}\\ \tilde{r}\end{bmatrix}\right), \quad (23)$$

where $$\mathbf{I}_{a.m.} = \begin{bmatrix}A & 0 & 0\\ 0 & B & 0\\ 0 & 0 & C\end{bmatrix} \text{ and } \mathbf{I}_{a.i.} = \begin{bmatrix}P & 0 & 0\\ 0 & Q & 0\\ 0 & 0 & R\end{bmatrix}. \quad (24)$$

Apparent mass and inertia values $A$, $B$, $C$, $P$, $Q$, and $R$ appearing in Eq.(24) can be calculated for known simple shapes or can be approximated as discussed in Lissaman, P., and Brown, G., "Apparent Mass Effects on Parafoil Dynamics," AIAA Paper 93-1236, May 1993.

Dynamic equations are formed by summing forces and moments about the system mass center, both in the body reference frame, and equating to the time derivative of linear and angular momentum. Final dynamic equations of motion are expressed compactly in matrix form below, where for the quantities in Eq.(24) the common convention is used for tensors of second rank such that $\mathbf{I}'_{\xi} = \mathbf{T}_{BP}^{T}\mathbf{I}_{\xi}\mathbf{T}_{BP}$:

$$\begin{bmatrix}m\mathbf{I}_{3\times 3}+\mathbf{I}'_{a.m.} & -\mathbf{I}'_{a.m.}\mathbf{S}^{B}_{r_{BM}}\\ \cdots & \cdots & \cdots\\ \mathbf{S}^{B}_{r_{BM}}\mathbf{I}'_{a.m.} & \mathbf{I}+\mathbf{I}'_{a.i.}-\mathbf{S}^{B}_{r_{BM}}\mathbf{I}'_{a.m.}\mathbf{S}^{B}_{r_{BM}}\end{bmatrix}\begin{bmatrix}\dot{u}\\ \dot{v}\\ \dot{w}\\ \cdots\\ \dot{p}\\ \dot{q}\\ \dot{r}\end{bmatrix} = \begin{bmatrix}\mathbf{F}\\ \cdots\\ \mathbf{M}\end{bmatrix}, \quad (25)$$

where $\mathbf{I}_{3\times 3}$ is the identity matrix, $\mathbf{I} = \begin{bmatrix}I_{xx} & 0 & I_{xz}\\ 0 & I_{yy} & 0\\ I_{zx} & 0 & I_{zz}\end{bmatrix}$, $$\mathbf{F} = \mathbf{F}_{a} + \mathbf{F}_{g} - m\mathbf{S}^{B}_{\omega}\begin{bmatrix}u\\ v\\ w\end{bmatrix} - \mathbf{T}_{BP}^{T}\mathbf{S}_{\omega}^{P}\mathbf{I}_{a.m.}\begin{bmatrix}\tilde{u}\\ \tilde{v}\\ \tilde{w}\end{bmatrix} - \mathbf{I}'_{a.m.}\mathbf{S}^{B}_{\omega}\mathbf{T}_{IB}\mathbf{W}, \quad (26)$$

$$\mathbf{M} = \mathbf{M}_{a} - \mathbf{S}^{B}_{\omega}\mathbf{I}\begin{bmatrix}p\\ q\\ r\end{bmatrix} - \mathbf{S}^{B}_{r_{BM}}\mathbf{T}_{BP}^{T}\mathbf{S}_{\omega}^{P}\mathbf{I}_{a.m.}\begin{bmatrix}\tilde{u}\\ \tilde{v}\\ \tilde{w}\end{bmatrix} - \mathbf{T}_{BP}^{T}\mathbf{S}_{\omega}^{P}\mathbf{I}_{a.i.}\begin{bmatrix}\tilde{p}\\ \tilde{q}\\ \tilde{r}\end{bmatrix} + \mathbf{S}^{B}_{r_{BM}}\mathbf{I}'_{a.m.}\mathbf{S}^{B}_{\omega}\mathbf{T}_{IB}\mathbf{W}. \quad (27)$$

Appendix B

Terminal Guidance

The last three phases introduced in Appendix A (Phases 4-6) are the most critical stages of parafoil guidance. The system must be dropped up wind of the target to ensure it can be reached, however, it is desired to impact the target traveling into the wind to reduce ground speed. In addition it is beneficial to arrive near the target with excess altitude in order to make final guidance decisions. Finally, there is a very strict time limitation. The ADS can be slightly late or earlier departing/arriving to all other phases, but this last Phase 6 ends sharply at landing. All this means that special precautions have to be made in building a control algorithm for the terminal phase.

First, assume that there is no cross wind component, i.e. that the ground winds uploaded to the system before deployment have not changed. An ideal terminal guidance trajectory can be defined as outlined in Fig. B, where the following notations are used (Fig. B represents the left approach pattern, but everything will be the same for the right pattern as well.):

$x, y, z$ — a standard right-handed North-East-Down coordinate frame with the origin at the target;

$t_{start}$ — time corresponding to the beginning of the downwind leg (Phase 4);

$t_0$ — time corresponding to the beginning of the final 180°-turn (Phase 5);

$t_1$ — time corresponding to intercepting the final approach (Phase 6);

$t_{exit}$ — time when guidance switches from Phase 5 to Phase 6;

$t_2$ — time of touchdown;

$L$ — distance away from the target line;

$D_{switch}$ — optimal distance to pass the target (initiating a final turn at $t_0$ should achieve the desired impact location);

$T_{turn} = t_1 - t_0$ — final turn time;

$T_{app} = t_2 - t_1$ — final approach time, determining $t_0$ and $D_{switch}$ (a large value allows correction for terminal errors and reduces errors from changing winds, while a small value reduces errors during final approach);

$R$ — final turn radius;

$W$ — wind (positive when coming from the $x_f$ direction and negative as shown in Fig. B);

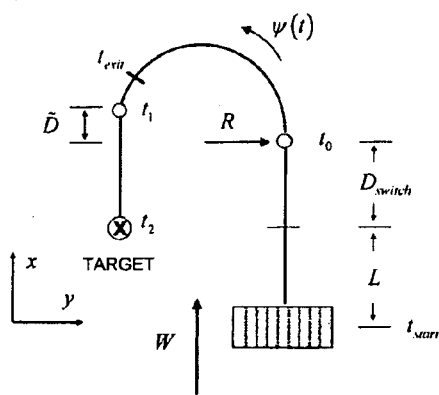

Fig. B Terminal guidance maneuver.

$\psi(t)$ — final turn function for parafoil to track during the final turn;

$\tilde{D} = WT_{turn}$ — distance defined by imperfection (asymmetry) of the final turn because of the wind.

The terminal guidance problem can be summarized as follows. For a parafoil in the presence of wind $W$, at altitude $z$, and a distance $L$ from the target, find the distance $D_{switch}$ to the final turn initiation point (TIP), required to travel past the target for an ideal impact at $t_2$ (of course, $D_{switch}$ is a function of the desired $T_{app}^{des}$.)

In general, the dynamic model of a parafoil is complex and nonlinear, so that the problem can only be solved numerically. However, in what follows we will make some assumptions, allowing an analytical solution to be used as a reference trajectory in the control algorithm. These assumptions are: a) the turn rate is slow, so that the roll and sideslip angles can be ignored, and b) the descent rate $V_v^*$ and air speed $V_h^*$ are viewed as nearly constant (defined by the canopy, lines, etc. and treated as the known values). In this case it immediately follows that $$t_2 = t_{start} - \frac{z_{start}}{V_v^*}. \tag{1}$$

The problem reduces to handling a simple kinematic model represented by three components of the ground velocity as:

$$\begin{bmatrix} \dot{x} \\ \dot{y} \\ \dot{z} \end{bmatrix} = \begin{bmatrix} -W + V_h^* \cos\psi \\ V_h^* \sin\psi \\ V_v^* \end{bmatrix}. \tag{2}$$

Now, the reference turn function $\psi(t)$ can be chosen as any function that satisfies the boundary conditions $\psi(t_0) = 0$ and $\psi(t_1) = -\pi$ (for the left pattern as shown on Fig. B). For instance, for a linear turn (constant turn rate) the solution to the required turn rate and the final turn time $T_{turn}$ are provided by:

$$\dot{\psi} = -\frac{V_h^*}{R} \text{ and } T_{turn} = \frac{\pi R}{V_h^*}. \tag{3}$$

Hence, the most straightforward algorithm to control the descending system at the terminal phase is to control its turn rate for example as follows:

$$\dot{\psi}^c = \mp \frac{V_h^*}{R} \tag{4}$$

(the plus-minus signs correspond to the left and right turn, respectively). After the final turn the system travels directly to the desired target. Assuming that the wind $W$ is constant all way down and a constant turn rate (3), integration of inertial velocities along axes $x$ and $y$ from $t_{start}$ to $t_2$ (Phases 4-6) yields two simple equalities:

$$D_{switch} - \int_{t_0}^{t_1} \dot{x}\,dt - \int_{t_1}^{t_2} \dot{x}\,dt = D_{switch} - WT_{turn} - (V_h^* + W)T_{app} = 0, \tag{5}$$

$$z + V_v^* \left( \frac{L + D_{switch}}{V_h^* - W} \right) + V_v^* t_{turn} + V_v^* t_{app} = 0. \tag{6}$$

Resolving them with respect to $D_{switch}$ and a $T_{app}$ results in $$D_{switch} = WT_{turn} + \left( \frac{V_h^{*2} - W^2}{2V_h^*} \right) \left( \frac{-z}{V_v^*} - T_{turn} - \frac{L + WT_{turn}}{V_h^* - W} \right), \tag{7}$$

$$T_{app} = \left( \frac{V_h^* - W}{2V_h^*} \right) \left( \frac{-z}{V_v^*} - T_{turn} \right) - \frac{L + WT_{turn}}{2V_h^*}. \tag{8}$$

From Eqs.(7) and (8) it can be seen that the higher the altitude $z$, the larger $D_{switch}$ and $T_{app}$ become. As the parafoil loiters upwind of the target, $z_{start}$ the altitude at which to turn towards the target can be found by using a desired final approach time $T_{app}^{des}$. The switching altitude to achieve $T_{app}^{des}$ is then given by solving Eq.(8) for $z$ leading to the following expression:

$$z_{start} = -V_v^* \left( T_{turn} + \frac{L + WT_{turn}}{V_h^* - W} + \frac{2V_h^*}{V_h^* - W} T_{app}^{des} \right) = V_v^* \frac{L + V_h^*(T_{turn} + 2T_{app}^{des})}{W - V_h^*}. \tag{9}$$

Once the system is traveling towards the target the goal is to bring the system from its initial state at the top of the downwind led to the point defined by $x_T = D_{switch}$ and $y_T = \mp 2R$ (for the left and right turn, respectively). The distance $\hat{D}_{switch}$ is estimated during the downwind leg constantly using the analogue of Eq.(7):

$$\hat{D}_{switch} = \hat{W}T_{turn} + \left( \frac{\hat{V}_h^{*2} - \hat{W}^2}{2\hat{V}_h^*} \right) \left( \frac{-\hat{z}}{\hat{V}_v^*} - T_{turn} - \frac{\hat{x} + \hat{W}T_{turn}}{\hat{V}_h^* - \hat{W}} \right) = -\frac{\hat{z}(\hat{V}_h^{*2} - \hat{W}^2) + \hat{V}_h^* \hat{V}_v^* T_{turn}(\hat{V}_h^* - \hat{W}) + \hat{x}\hat{V}_v^*(\hat{V}_h^* + \hat{W})}{2\hat{V}_h^* \hat{V}_v^*}, \tag{10}$$

where $\hat{V}_h^*$, $\hat{V}_v^*$ and $\hat{W}$ are the estimates of the corresponding parameters at current position ($\hat{x}, \hat{z}$). Note, Eq.(10) produces the value of $\hat{D}_{switch}$ in the assumption that $V_h^*$, $V_v^*$ and $W$ remain constant from the current altitude all way down.

Appendix C

Optimal Terminal Guidance

To overcome the difficulties of fighting unaccounted winds the following two-point boundary-value problem (TPBVP) was formulated. Staring at some initial point at $t=0$ with the state vector defined as $\mathbf{x}_0 = [x_0, y_0, \psi_0]^T$ we need to bring our ADS influenced by the last known constant wind $\mathbf{w} = [W, 0, 0]^T$ to another point, $\mathbf{x}_f = \left[ \left( V_h^* + W \right) T_{app}^{des}, 0, -\pi \right]^T$ (for consistency with Appendix B we will consider a left pattern turn) at $t = t_f$. Hence, we need to find the trajectory that satisfies these boundary conditions along with a constraint imposed on control (yaw rate), $|\dot{\psi}| \leq \dot{\psi}_{max}$, while finishing the maneuver in exactly $T_{turn}$ seconds (if needed, the performance index may also include additional terms related to the compactness of the maneuver and/or control expenditure). The found optimal control $\dot{\psi}_{opt}(t)$ is then tracked by the ADS GNC unit using the MPC algorithm in Appendix A.

Unaccounted winds $\mathbf{w}^{dist} = [w_x, w_y, 0]^T$ (the vertical component will be accounted for indirectly via estimating the current $\hat{V}_v$) will not allow exact tracking of the calculated optimal trajectory. Computation of the optimal trajectory will be updated during the final turn, each time starting from the current (off the original trajectory) initial conditions, requiring the ADS to be at $\mathbf{x}_f = \left[ \left( V_h^* + W \right) T_{app}^{des}, 0, -\pi \right]^T$ in $T_{turn}$ seconds from the beginning of the turn. The remaining time until arrival at the final approach is computed as $$t_f = -\frac{\hat{z}}{\hat{V}_v} - T_{app}^{final}, \tag{1}$$

where $T_{app}^{final}$ is the final calculated approach time from Eq.(8) before entering the final turn.

Development of the optimal trajectory algorithm begins by recalling from Eq.(2) the horizontal trajectory knimematics:

$$\begin{bmatrix} \dot{x} \\ \dot{y} \end{bmatrix} = \begin{bmatrix} -W + V_h^* \cos\psi \\ V_h^* \sin\psi \end{bmatrix}. \tag{2}$$

Recognizing that if the final turn horizontal trajectory is given by Eq.(2) the yaw angle along this trajectory is related to the change of inertial coordinates as follows:

$$\psi = \tan^{-1} \frac{\dot{y}}{\dot{x} + W}. \tag{3}$$

Differentiating (3) provides the yaw rate control required to follow the reference final turn trajectory in presence of constant wind $W$:

$$\dot{\psi} = \frac{\ddot{y}(\dot{x} + W) - \ddot{x}\dot{y}}{(\dot{x} + W)^2 + \dot{y}^2}. \tag{4}$$

The inertial (ground) speed along the trajectory will also depend on the current yaw angle:

$$|V_G| = \sqrt{\dot{x}^2 + \dot{y}^2} = \sqrt{V_h^{*2} + W^2 - 2V_h^* W \cos\psi}. \qquad (5)$$

Now, following the general idea of direct methods of calculus of variations (e.g., see Yakimenko, O., "Direct Method for Rapid Prototyping of Near-Optimal Aircraft Trajectories," AIAA Journal of Guidance, Control, and Dynamics, vol.23, no.5, 2000, pp.865-875.) we will assume the solution of the TPBVP to be represented analytically as functions of some scaled abstract argument $\bar{\tau} = \tau / \tau_f \in [0;1]$:

$$\begin{aligned} x(\bar{\tau}) &= P_1(\bar{\tau}) = a_0^1 + a_1^1 \bar{\tau} + a_2^1 \bar{\tau}^2 + a_3^1 \bar{\tau}^3 + b_1^1 \sin(\pi\bar{\tau}) + b_2^1 \sin(2\pi\bar{\tau}), \\ y(\bar{\tau}) &= P_2(\bar{\tau}) = a_0^2 + a_1^2 \bar{\tau} + a_2^2 \bar{\tau}^2 + a_3^2 \bar{\tau}^3 + b_1^2 \sin(\pi\bar{\tau}) + b_2^2 \sin(2\pi\bar{\tau}). \end{aligned} \qquad (6)$$

The coefficients $a_i^\eta$ and $b_i^\eta$ ($\eta = 1,2$) in these formulas are defined by the boundary conditions up to the second-order derivative at $\tau = 0$ and $\tau = \tau_f$ ($\bar{\tau} = 1$). According to the problem formulation and Eq.(2) these boundary conditions are as follows:

$$\begin{bmatrix} x \\ y \end{bmatrix}_{\tau=0} = \begin{bmatrix} x_0 \\ y_0 \end{bmatrix}, \begin{bmatrix} \dot{x} \\ \dot{y} \end{bmatrix}_{\tau=0} = \begin{bmatrix} -W + V_h^* \cos\psi_0 \\ V_h^* \sin\psi_0 \end{bmatrix}, \begin{bmatrix} \ddot{x} \\ \ddot{y} \end{bmatrix}_{\tau=0} = \begin{bmatrix} -\dot{\psi}_0 V_h^* \sin\psi_0 \\ \dot{\psi}_0 V_h^* \cos\psi_0 \end{bmatrix}, \qquad (7)$$

$$\begin{bmatrix} x \\ y \end{bmatrix}_{\tau=\tau_f} = \begin{bmatrix} (V_h^* + W)T_{app}^{des} \\ 0 \end{bmatrix}, \begin{bmatrix} \dot{x} \\ \dot{y} \end{bmatrix}_{\tau=\tau_f} = \begin{bmatrix} -W - V_h^* \\ 0 \end{bmatrix}, \begin{bmatrix} \ddot{x} \\ \ddot{y} \end{bmatrix}_{\tau=\tau_f} = \begin{bmatrix} 0 \\ 0 \end{bmatrix}. \qquad (8)$$

While the final conditions (8) will be constant (the second derivatives are zeroed for a smooth arrival), the initial conditions will reflect the current state of the system at each cycle of optimization. Let us now differentiate Eqs.(6) two times with respect to $\tau$ to get:

$$\begin{aligned} \tau_f P_\eta'(\bar{\tau}) &= a_1^\eta + 2a_2^\eta \bar{\tau} + 3a_3^\eta \bar{\tau}^2 + \pi b_1^\eta \cos(\pi\bar{\tau}) + 2\pi b_2^\eta \cos(2\pi\bar{\tau}), \\ \tau_f^2 P_\eta''(\bar{\tau}) &= 2a_2^\eta + 6a_3^\eta \bar{\tau} - \pi^2 b_1^\eta \sin(\pi\bar{\tau}) - (2\pi)^2 b_2^\eta \sin(2\pi\bar{\tau}). \end{aligned} \qquad (9)$$

Equating these derivatives at the terminal points to the known boundary conditions (7)-(8) yields a system of linear algebraic equations to solve for coefficients $a_i^\eta$ and $b_i^\eta$ ($\eta = 1,2$). For instance, for the x-coordinate we'll get $$\begin{bmatrix} 1 & 0 & 0 & 0 & 0 & 0 \\ 1 & 1 & 1 & 1 & 0 & 0 \\ 0 & 1 & 0 & 0 & \pi & 2\pi \\ 0 & 1 & 2 & 3 & -\pi & 2\pi \\ 0 & 0 & 2 & 0 & 0 & 0 \\ 0 & 0 & 2 & 6 & 0 & 0 \end{bmatrix} \begin{bmatrix} a_0^1 \\ a_1^1 \\ a_2^1 \\ a_3^1 \\ b_1^1 \\ b_2^1 \end{bmatrix} = \begin{bmatrix} x_0 \\ x_f \\ \dot{x}_0 \tau_f \\ \dot{x}_f \tau_f \\ \ddot{x}_0 \tau_f^2 \\ \ddot{x}_f \tau_f^2 \end{bmatrix} \qquad (10)$$

Being resolved this system yields $$a_0^1 = x_0, \quad a_1^1 = -(x_0 - x_f) + \frac{(2x_0'' + x_f'')\tau_f^2}{6}, \quad a_2^1 = \frac{x_0''\tau_f^2}{2}, \quad a_3^1 = -\frac{(x_0'' - x_f'')\tau_f^2}{6};$$

$$b_1^1 = \frac{2(x_0' - x_f')\tau_f + (x_0'' + x_f'')\tau_f^2}{4\pi}, \quad b_2^1 = \frac{12(x_0 - x_f) + 6(x_0' + x_f')\tau_f + (x_0'' - x_f'')\tau_f^2}{24\pi}.$$  (11)

The only problem is that the derivatives in Eqs.(11) are taken in the virtual domain, while the actual boundary conditions are given in the physical domain. Mapping between the virtual domain $[0;\tau_f]$ and physical domain $[0;t_f]$ is addressed by introducing a speed factor $\lambda$:

$$\lambda = \frac{d\tau}{dt},$$  (12)

Using this speed factor we may now compute corresponding derivatives in the virtual domain using the obvious differentiation rules valid for any time-variant parameter $\xi$:

$$\dot{\xi} = \lambda \xi', \quad \ddot{\xi} = \lambda(\lambda'\xi' + \lambda\xi'').$$  (13)

Inverting Eqs.(13) yield:

$$\xi' = \lambda^{-1}\dot{\xi}, \quad \xi'' = \lambda^{-2}\ddot{\xi} - \lambda'\lambda^{-1}\dot{\xi}.$$  (14)

Note that we only need to use Eqs.(14) once to transfer the boundary conditions. Since the speed factor $\lambda$ simply scales the entire problem – the higher speed factor $\lambda$ is, the larger $\tau_f$ it results in (see explanation in Lukacs, J., and Yakimenko, O., "Trajectory-Shaping Guidance for Interception of Ballistic Missiles during the Boost Phase," AIAA Journal of Guidance, Control, and Dynamics, vol.31, no.5, 2008, pp.1524-1531.) – we may let $$\lambda_{0;f} = 1 \text{ and } \lambda'_{0;f} = 0,$$  (15)

which means we can safely assume $$\xi' = \dot{\xi}, \quad \xi'' = \ddot{\xi}.$$  (16)

Now let us describe the numerical procedure for finding the optimal solution among all candidate trajectories described by Eqs.(6). First, we guess the value of the only varied parameter $\tau_f$ and compute the coefficients of the candidate trajectory using Eqs.(11) with the boundary conditions (7) and (8) converted to the virtual domain via Eqs.(14) (accounting for Eqs.(15)). For the initial value of $\tau_f$ we can take the length of the circumference connecting terminal points:

$$\tau_f = \frac{\pi}{2}\sqrt{(x_f - x_0)^2 + (y_f - y_0)^2}.$$  (17)

Having an analytical representation of the candidate trajectory, Eqs.(6) and (9), define the values of $x_j$, $y_j$, $x'_j$, and $y'_j$, $j = 1,...,N$ over a fixed set of $N$ points spaced evenly along the virtual arc $[0;\tau_f]$ with the interval $$\Delta\tau = \tau_f(N-1)^{-1},$$  (18)

so that $$\tau_j = \tau_{j-1} + \Delta\tau, \quad j = 2,...,N, (\tau_1 = 0). \tag{19}$$

Then, for each node $j = 2,...,N$ we compute $$\Delta t_{j-1} = \sqrt{\frac{(x_j - x_{j-1})^2 + (y_j - y_{j-1})^2}{V_h^{*2} + W^2 - 2V_h^* W \cos\psi_{j-1}}} \tag{20}$$

$(\psi_1 \equiv \psi_0)$, and $$\lambda_j = \Delta\tau \Delta t_{j-1}^{-1}. \tag{21}$$

The yaw angle $\psi$ can now be computed using the virtual domain version of Eq.(3):

$$\psi_j = \tan^{-1} \frac{\lambda_j y_j'}{\lambda_j x_j' + W}. \tag{22}$$

Finally, the yaw rate $\dot{\psi}$ is evaluated using Eq.(4) (with time derivatives evaluated using Eq.(23)) or simply as $$\dot{\psi}_j = (\psi_j - \psi_{j-1})\Delta t_{j-1}^{-1}. \tag{23}$$

When all parameters (states and controls) are computed in each of the $N$ points, we can compute the performance index $$J = \left(\sum_{j=1}^{N-1} \Delta t_j - T_{turn}\right)^2 + k^{\dot{\psi}} \Delta, \tag{24}$$

where $$\Delta = \max_j \left(0; |\dot{\psi}_j| - \dot{\psi}_{max}\right)^2 \tag{25}$$

with $k^{\dot{\psi}}$ being a scaling (weighting) coefficient. Now the problem can be solved say in the Mathworks' development environment with as simple built-in optimization function as *fminbnd*. It should be noted that the numerical algorithm based on the direct method introduced in this Appendix with the non-gradient optimization routine *fminbnd* based on the straight forward golden section search and parabolic interpolation algorithm allows computing the optimal turn trajectory very fast. To be more specific a 16bit 80MHz processor, allowed computation of the 17.5 second turn maneuver with $N = 20$ in 10 iterations, which took only 0.07s all together. With the controls update rate of 0.25s that means that the trajectory can be updated as often as every control cycle.

Appendix D

More General Optimal Terminal Guidance with Known Wind Profiles

The optimal turn computation presented in Appendix C for the simple case of a constant speed profile can be generalized even further if there is more information about the winds known a priori. For example, assume that instead of a constant x-component of the prevailing wind versus altitude $h$ we have a linear profile $$W(h) = W_G + kh \tag{1}$$

where $W_G$ is a known ground wind and coefficient $k = \dfrac{W_0 - W_G}{h_0}$ is defined by the ground wind $W_G$ and wind $W_0$ measured at altitude $h_0 = -z_0$ (corresponding to the point where the final turn begins).

Then, the two-point boundary-value problem will be formulated for a slightly different system of kinematic equations $$\begin{bmatrix} \dot{x} \\ \dot{y} \end{bmatrix} = \begin{bmatrix} -W(h) + V_h^* \cos\psi \\ V_h^* \sin\psi \end{bmatrix} \tag{2}$$

and different boundary conditions. To be more specific, staring from some different initial point, defined by a different expression for a $D_{switch}$, we will need to bring a parafoil to the point $$x_f = \left[ \left(V_h^* + W\right) T_{app}^{des} + \frac{k}{2} V_v^* (T_{app}^{des})^2, 0, -\pi \right]^T \tag{8}$$

To compute the offset in Eq.(8) we used the fact that the final approach starts at the altitude $V_v^* T_{app}^{des}$, so that using the obvious relation $$dt = \frac{dh}{V_v^*} \tag{9}$$

we may write $$x_f = \int_0^{T_{app}^{des}} \left(V_h^* + W\right) dt = \int_0^{V_v^* T_{app}^{des}} \left(V_h^* + W\right) \frac{dh}{V_v^*} = \left(V_h^* + W_G\right) T_{app}^{des} + \frac{k}{2} V_v^* (T_{app}^{des})^2 \tag{10}$$

In this case, inverting equations (7) yeilds $$\psi = \tan^{-1} \frac{\dot{y}}{\dot{x} + W(h)} \tag{11}$$

and its differentiation should account for Eq.(6), so that $$\dot{\psi} = \frac{\ddot{y}(\dot{x}+W)-(\ddot{x}+\dot{W})\dot{y}}{(\dot{x}+W)^2+\dot{y}^2} = \frac{\ddot{y}(\dot{x}+W)-(\ddot{x}+kV_v^*)\dot{y}}{(\dot{x}+W)^2+\dot{y}^2}. \quad (12)$$

The only modifications the numerical algorithm will require is that it will involve the new boundary conditions $$\begin{bmatrix}\dot{x}\\\dot{y}\end{bmatrix}_{\tau=0} = \begin{bmatrix}-W_0+V_h^*\cos\psi_0\\V_h^*\sin\psi_0\end{bmatrix}, \quad \begin{bmatrix}\ddot{x}\\\ddot{y}\end{bmatrix}_{\tau=0} = \begin{bmatrix}-kV_v^*-\dot{\psi}_0 V_h^*\sin\psi_0\\\dot{\psi}_0 V_h^*\cos\psi_0\end{bmatrix}, \quad (13)$$

$$\begin{bmatrix}x\\y\end{bmatrix}_{\tau=\tau_f} = \begin{bmatrix}(V_h^*+W_G)T_{app}^{des}+\frac{k}{2}V_v^*(T_{app}^{des})^2\\0\end{bmatrix}, \quad \begin{bmatrix}\dot{x}\\\dot{y}\end{bmatrix}_{\tau=\tau_f} = \begin{bmatrix}-W_G-kV_v^*T_{app}^{des}-V_h^*\\0\end{bmatrix}, \quad (14)$$

computation of an altitude $$h_j = h_{j-1} - V_v^*\Delta t_{j-1}, \; j=2,\ldots,N, \; (h_1=-z_0). \quad (15)$$

and the corresponding wind magnitude $$W_j = W_G + kh_j \quad (16)$$

The latter two values will be used in $$\Delta t_{j-1} = \sqrt{\frac{(x_j-x_{j-1})^2+(y_j-y_{j-1})^2}{V_h^{*2}+0.25(W_j+W_{j-1})^2-V_h^*(W_j+W_{j-1})\cos\psi_{j-1}}} \quad (17)$$

and $$\psi_j = \tan^{-1}\frac{\lambda_j y_j'}{\lambda_j x_j'+W_j}. \quad (18)$$

In the case of a logarithmic wind profile $$W(h) = \beta + a\ln(h) \quad (19)$$

some of the above equations will be replaced with the new ones $$x_f = \int_0^{V_v^* T_{app}^{des}} (V_h^*+W)\frac{dh}{V_v^*} = (V_h^*+\alpha-\beta)T_{app}^{des}+\beta T_{app}^{des}\ln(V_v^* T_{app}^{des}) \quad (20)$$

$$\begin{bmatrix}\ddot{x}\\\ddot{y}\end{bmatrix}_{\tau=0} = \begin{bmatrix}-ah_0^{-1}V_v^*-\dot{\psi}_0 V_h^*\sin\psi_0\\\dot{\psi}_0 V_h^*\cos\psi_0\end{bmatrix}, \quad (21)$$

$$\begin{bmatrix}x\\y\end{bmatrix}_{\tau=\tau_f} = \begin{bmatrix}(V_h^*+\alpha-\beta)T_{app}^{des}+\beta T_{app}^{des}\ln(V_v^* T_{app}^{des})\\0\end{bmatrix}, \quad \begin{bmatrix}\dot{x}\\\dot{y}\end{bmatrix}_{\tau=\tau_f} = \begin{bmatrix}-\beta-a\ln(V_v^* T_{app}^{des})-V_h^*\\0\end{bmatrix}, \quad (22)$$

and $$W_j = \beta + a \ln(h_j) \qquad (23)$$

The remaining ones will be the same.

Similarly, the optimization routine can accommodate crosswinds is they are known in one form or another. This may happen when the horizontal winds profile versus altitude is available. Consider $$W_x(h) = f_x(h), \qquad W_y(h) = f_y(h) \qquad (24)$$

to be x- and y- components of a horizontal wind profile approximated with some analytical dependence (e.g. of the form of Eq.(6) or (16) or cubic spline). Then, we can write $$\begin{bmatrix} \dot{x} \\ \dot{y} \end{bmatrix} = \begin{bmatrix} -W_x(h) + V_h^* \cos\psi \\ W_y(h) + V_h^* \sin\psi \end{bmatrix} \qquad (25)$$

The final point will then be defined as $$\mathbf{x}_f = \begin{bmatrix} x_f, y_f, -\pi \end{bmatrix}^T \qquad (26)$$

where offsets in x- and y- directions will be computed as $$x_f = V_h^* T_{app}^{des} + \int_0^{V_v^* T_{app}^{des}} W_x(h) \frac{dh}{V_v^*}, \qquad y_f = -\int_0^{V_v^* T_{app}^{des}} W_y(h) \frac{dh}{V_v^*} \qquad (27)$$

The heading angle equation will look as $$\psi = \tan^{-1} \frac{\dot{y} - W_y(h)}{\dot{x} + W_x(h)} \qquad (28)$$

while its derivative will be presented by $$\dot{\psi} = \frac{(\ddot{y} - W_y'(h) V_v^*)(\dot{x} + W_x(h)) - (\ddot{x} + W_x'(h) V_v^*)(\dot{y} - W_y(h))}{(\dot{x} + W_x(h))^2 + (\dot{y} - W_y(h))^2} \qquad (29)$$

The total speed will be expressed as $$|V_G| = \sqrt{\dot{x}^2 + \dot{y}^2} = \sqrt{V_h^{*2} + \left(W_x(h) + W_y(h)\right)^2 - 2V_h^* \left(W_x(h)\cos\psi - W_y(h)\sin\psi\right)}. \qquad (30)$$

The numerical procedure will proceed with the boundary conditions $$\begin{bmatrix} x \\ y \end{bmatrix}_{\tau=0} = \begin{bmatrix} x_0 \\ y_0 \end{bmatrix}, \quad \begin{bmatrix} \dot{x} \\ \dot{y} \end{bmatrix}_{\tau=0} = \begin{bmatrix} -W_x(h_0) + V_h^* \cos\psi_0 \\ W_y(h_0) + V_h^* \sin\psi_0 \end{bmatrix}, \quad \begin{bmatrix} \ddot{x} \\ \ddot{y} \end{bmatrix}_{\tau=0} = \begin{bmatrix} -W_x'(h) V_v^* - \dot{\psi}_0 V_h^* \sin\psi_0 \\ W_y'(h) V_v^* + \dot{\psi}_0 V_h^* \cos\psi_0 \end{bmatrix}, \qquad (31)$$

$$\begin{bmatrix} x \\ y \end{bmatrix}_{r=r_f} = \begin{bmatrix} x_f \\ y_f \end{bmatrix}, \quad \begin{bmatrix} \dot{x} \\ \dot{y} \end{bmatrix}_{r=r_f} = \begin{bmatrix} -W_x(h) - V_h^* \\ W_y(h) \end{bmatrix}, \quad \begin{bmatrix} \ddot{x} \\ \ddot{y} \end{bmatrix}_{r=r_f} = \begin{bmatrix} 0 \\ 0 \end{bmatrix}. \tag{32}$$

and will involve computing wind components at each step $$W_{xj} = f_x(h_j) \quad \text{and} \quad W_{yj} = f_y(h_j) \tag{33}$$

to be used in the numerical equations similar to those above.

Appendix E

Ballistic Winds

For operational use the vertical winds profile can be reduced to the so-called ballistic winds. In other words, if at some altitude $H$ we have a ballistic wind of magnitude $W_B$ and direction $\Psi_W$, then the effect of variable winds $w(h)$ for some system with the descent rate $V_v$ on its way from altitude $H$ down to the surface is reduced to simple formulas:

$$x(h) = \frac{H}{V_v} W_B \cos \Psi_W$$
$$y(h) = \frac{H}{V_v} W_B \sin \Psi_W$$
(1)

or in other words $$\int_0^H \frac{1}{V_v} w(h) \cos \psi_w(h) dh = \frac{H}{V_v} W_B \cos \Psi_W$$
$$\int_0^H \frac{1}{V_v} w(h) \sin \psi_w(h) dh = \frac{H}{V_v} W_B \sin \Psi_W$$
(2)

Substituting integrals with the finite sum of trapezoids based on the discrete values of $h_k$, $w_k$ and $\psi_{w;k}$, $k = 1, ..., M$, we get $$\sum_{k=2}^{M} (h_k - h_{k-1}) \frac{w_k \cos \psi_{w;k} + w_{k-1} \cos \psi_{w;k-1}}{2} = h_M W_M \cos \Psi_{W;M}$$
$$\sum_{k=2}^{M} (h_k - h_{k-1}) \frac{w_k \sin \psi_{w;k} + w_{k-1} \sin \psi_{w;k-1}}{2} = h_M W_M \sin \Psi_{W;M}$$
(3)

The index starts from 2 because by definition the winds measurements at the lowest altitude can be considered ballistic winds at this altitude.

From Eqs.(3) it further follows that $$\tan \Psi_{W,M} = \frac{\sum_{k=2}^{M}(h_k - h_{k-1})(w_k \sin \psi_{w;k} + w_{k-1} \sin \psi_{w;k-1})}{\sum_{k=2}^{M}(h_k - h_{k-1})(w_k \cos \psi_{w;k} + w_{k-1} \cos \psi_{w;k-1})}$$

$$W_M = \frac{1}{2 h_M} \sqrt{\left(\sum_{k=2}^{M}(h_k - h_{k-1})(w_k \cos \psi_{w;k} + w_{k-1} \cos \psi_{w;k-1})\right)^2 + \left(\sum_{k=2}^{M}(h_k - h_{k-1})(w_k \sin \psi_{w;k} + w_{k-1} \sin \psi_{w;k-1})\right)^2}$$
(4)

For the specific case when $h_k - h_{k-1} = \Delta h = const$, $k = 2, ..., M$, Eqs.(42) can be further reduced to $$\tan \Psi_{w;M} = \frac{\sum_{k=2}^{M}\left(w_k \sin\psi_{w;k} + w_{k-1}\sin\psi_{w;k-1}\right)}{\sum_{k=2}^{M}\left(w_k \cos\psi_{w;k} + w_{k-1}\cos\psi_{w;k-1}\right)}$$

$$W_M = \frac{\Delta h}{2h_M}\sqrt{\left(\sum_{k=2}^{M}\left(w_k \cos\psi_{w;k} + w_{k-1}\cos\psi_{w;k-1}\right)\right)^2 + \left(\sum_{k=2}^{M}\left(w_k \sin\psi_{w;k} + w_{k-1}\sin\psi_{w;k-1}\right)\right)^2}$$

(5)

Appendix F

Logarithmic Winds Model

In the following derivation, the assumption of a constant or piecewise constant wind profile will be discarded and replaced by the assumption that wind speed $W$ varies logarithmically with altitude $z$ as:

$$W(h) = (m_W)\ln(h/h_0), \quad (W(h) = 0, \text{ for } h \leq h_0) \tag{1}$$

where $\alpha$ and $\beta$ are constants. Note that, since altitude $z$ is represented as a negative number according to the sign convention in use, an additional factor of $-1$ is included in the argument of the logarithm. The derivation uses this assumption for the wind profile, along with the assumptions that the steady-state, no-wind values of the ADS horizontal and vertical velocities are known and labeled $V_h^*$ and $V_v^*$. Furthermore, it is assumed that the wind vector lies only in the horizontal plane, and is parallel with the $x$ axis of the coordinate system depicted in Fig. B in Appendix B. Using the assumptions of constant steady-state no-wind vertical velocity and no vertical wind component, the time derivative of the $z$ coordinate, $\dot{z}$, is just equal to $V_v^*$, where downward change has a positive sign. Thus, the z-budget equation in Appendix B can be simplified.

$$z_{start} + V_v^* T_{downwind} + V_v^* T_{turn} + V_v^* T_{app} = 0 \tag{2}$$

where $T_{downwind}$ represents the time duration required to travel the sum of distances L and $D_{switch}$. Again, recall that under the sign convention being used here, zstart is a negative number and that $V_v^*$ and all time durations are positive. Assuming that the Snowflake's turn rate is constant, and that the turn will encompass 180° of a circle of known radius R, the time duration for the turn $T_{turn}$ is a known constant in terms of R and $V_h^*$ (see Appendix B, Eq. 33). Therefore, this equation has only two unknowns: $T_{downwind}$ and $T_{app}$.

Under the assumption of a constant wind profile, a simple expression for $T_{downwind}$ could be written in terms of unknown value $D_{switch}$. Also using the constant wind profile assumption, the x-budget equation in Appendix B can be simplified into an equation containing two unknowns: $D_{switch}$ and $T_{app}$; therefore the two linear equations in two unknowns could easily be solved. Under the assumption of a logarithmic wind profile as in Eq. (1) on the current page, $T_{downwind}$ cannot be replaced by a simple expression containing $D_{switch}$. Instead, in order to compute $T_{downwind}$ assuming that the wind profile is logarithmic, a value of $D_{switch}$ must be assumed, and then the time t0 can be computed. Time t0 is computed using the assumption of constant vertical velocity from the following simple relation:

$$t_0 = \frac{z_0 - z_{start}}{V_v^*} + t_{start} \quad (3)$$

where altitude z0 had been calculated using the Lambert W function as follows:

$$z_0 = \frac{c}{bW\left(-\frac{ce^{a/b}}{b}\right)} \quad (4)$$

where $a$, $b$, and $c$ are constants that can be expressed in terms of known quantities $V_h^*$, $V_v^*$, a, b, L, $z_{start}$, and assumed quantity $D_{switch}$.

The iteration procedure to calculate $D_{switch}$ is as follows:

1. Select an initial guess value for $D_{switch}$
2. Using the initial guess value for Dswitch, calculate $z_0$ using Eq. (4) on this page, and $T_{downwind}$ from:

$$T_{downwind} = \frac{z_0 - z_{start}}{V_v^*} \quad (5)$$

3. Using $T_{downwind}$, calculate $T_{app}$ using Eq. (2) on the previous page $$T_{app} = \frac{-z_{start}}{V_v^*} - T_{turn} - T_{downwind} \quad (6)$$

4. Compute $z_1$ using the assumption of constant vertical velocity $$z_1 = z_0 + V_v^* T_{turn} \quad (7)$$

5. Compute $\tilde{D}$ from known quantities:

$$\tilde{D} = \left(-m_W \ln(h_0) - m_W\right)T_{turn} - \frac{m_W}{V_v^*}\left[-z_0 \ln(-z_0) - z_1 \ln(-z_1)\right] \quad (8)$$

6. Compute $L_{app}$ using $T_{app}$ using:

$$L_{app} = \left(V_h^* - m_W \ln(h_0) - m_W\right)T_{app} + \frac{m_W h_0}{V_v^*} + m_W T_{app} \ln\left(T_{app} V_v^*\right) \quad (9)$$

7. Compute $D_{switch}$ from:

$$D_{switch} = \tilde{D} + L_{app} \quad (10)$$

8. Use value of $D_{switch}$ computed in step 7 as the next iteration estimate of $D_{switch}$ in step 1. Repeat iterations until differences between subsequent values of $D_{switch}$ are below a threshold value.

The invention claimed is:

1. A method, comprising:
    delivering a parafoil into the sky, said parafoil comprising:
        at least one control unit comprising a method for automatically guiding a parafoil and electronic circuitry for controlling one or more control motors based on said method for automatically guiding a parafoil;
        at least one or more control motors for operating one or more parafoil trailing lines; and
        one or more parafoil trailing lines for controlling a descent of the parafoil;
    releasing said parafoil so that said parafoil falls into a flight path under the directional guidance of the control unit;
    performing the following method for automatically guiding a parafoil with said parafoil's control unit said method for automatically guiding a parafoil comprising:
        wirelessly receiving at said parafoil a description of a moving target's vehicle type;
        calculating a desired landing location for said parafoil, said desired landing location corresponding to said moving target, said calculating including using a term representative of said moving target's velocity;
        determining a planned flight path to said desired landing location;
            controlling said one or more control motors to operate said one or more parafoil trailing lines, said operation of said one or more parafoil trailing lines controlling said parafoil's flight path; and,
            controlling said parafoil's flight path so as to follow said planned flight path.

2. The method of claim 1 wherein said moving target is a ship.

3. The method of claim 1 wherein said moving target is moving with a wind.

4. The method of claim 1 wherein said method further comprises adjusting said flight path in view of said moving target's vehicle type.

5. The method of claim 1 further comprising extracting information describing a position of a landing area on said moving target for said vehicle type from a data store of said electronic control unit.

6. A non-transitory machine readable storage medium having stored thereon program code that when processed by a processing unit for a parafoil's electronic control unit causes a method for automatically guiding a parafoil to be performed, said method for automatically guiding a parafoil comprising:
    wirelessly receiving at said parafoil a description of a moving target's vehicle type;
    calculating a desired landing location for said parafoil, said desired landing location corresponding to said moving target, said calculating including using a term representative of said moving target's velocity;
    determining a planned flight path to said desired landing location;
    controlling one or more control motors of said parafoil to operate one or more parafoil trailing lines of said parafoil, said operation of said one or more parafoil trailing lines controlling said parafoil's flight path; and,
    controlling said parafoil's flight path so as to follow said planned flight path.

7. The machine readable storage medium of claim 6 wherein said moving target is a ship.

8. The machine readable storage medium of claim 6 wherein said moving target is moving with a wind.

9. The machine readable storage medium of claim 6 wherein said method further comprises adjusting said flight path in view of said moving target's vehicle type.

10. The machine readable storage medium of claim 6 wherein said method further comprises extracting information describing a position of a landing area on said moving target for said vehicle type from a data store of said electronic control unit.

11. An electronic control unit for a parafoil having an electronic processing unit to perform a method for automatically guiding a parafoil while said electronic control unit is being transported by said parafoil, said electronic control unit comprising:
    electronic circuitry; and
    a method for automatically guiding a parafoil, said method comprising:
    wirelessly receiving at said parafoil a description of a moving target's vehicle type;
    calculating a desired landing location for said parafoil, said desired landing location corresponding to a said moving target, said calculating including using a term representative of said moving target's velocity;
    determining a planned flight path to said desired landing location;
    controlling one or more control motors of said parafoil to operate one or more parafoil trailing lines of said parafoil, said operation of said one or more parafoil trailing lines controlling said parafoil's flight path; and,
    controlling said parafoil's flight path so as to follow said planned flight path.

12. The electronic control unit of claim 11 wherein said moving target is a ship.

13. The electronic control unit of claim 11 wherein said moving target is moving with a wind.

14. The electronic control unit of claim 11 wherein said method further comprises adjusting said flight path in view of said moving target's vehicle type.

15. The electronic control unit of claim 11 wherein said method further comprises extracting information describing a position of a landing area on said moving target for said vehicle type from a data store of said electronic control unit.

* * * * *